United States Patent
Laguette et al.

(10) Patent No.: US 12,440,507 B2
(45) Date of Patent: Oct. 14, 2025

(54) STING INHIBITORS AND THEIR THERAPEUTIC USES

(71) Applicants: CENTRE NATIONAL DE LA RECHERCHE SCIENTIFIQUE, Paris (FR); Université de Montpellier, Montpellier (FR); Centre of Molecular and Macromolecular Studies Polish Academy of Sciences, Lodz (PL)

(72) Inventors: Nadine Laguette, Clapiers (FR); Jessica Guerra, Montpellier (FR); Barbara Nawrot, Dabrowka Wielka (PL); Renata Kaczmarek, Lodz (PL)

(73) Assignees: CENTRE NATIONAL DE LA RECHERCHE SCIENTIFIQUE, Paris (FR); UNIVERSITÉ DE MONTPELIER, Montpelier (FR); CENTER OF MOLECULAR AND MACROMOLECULAR STUDIES, Lodz (PL)

( * ) Notice: Subject to any disclaimer, the term of this patent is extended or adjusted under 35 U.S.C. 154(b) by 885 days.

(21) Appl. No.: 17/638,537

(22) PCT Filed: Sep. 4, 2020

(86) PCT No.: PCT/EP2020/074785
§ 371 (c)(1),
(2) Date: Feb. 25, 2022

(87) PCT Pub. No.: WO2021/043992
PCT Pub. Date: Mar. 11, 2021

(65) Prior Publication Data
US 2023/0017490 A1    Jan. 19, 2023

(30) Foreign Application Priority Data

Sep. 6, 2019   (EP) .................................... 19306072

(51) Int. Cl.
*A61K 31/7076* (2006.01)
*A61P 29/00* (2006.01)

(52) U.S. Cl.
CPC .......... *A61K 31/7076* (2013.01); *A61P 29/00* (2018.01)

(58) Field of Classification Search
None
See application file for complete search history.

(56) References Cited

FOREIGN PATENT DOCUMENTS

WO    2016120305 A1    8/2016

OTHER PUBLICATIONS

Hilgers, Werner, and Scott E. Kern. "Molecular genetic basis of pancreatic adenocarcinoma." Genes, Chromosomes and Cancer 26.1 (1999): 1-12.*
Varnum James M et al, "Di-, tri- and tetra-5'-O-phosphorothioadenosyl substituted polyols as inhibitors of Fhit: Importance of the [alpha]-[beta] bridging oxygen and [beta] phosphorus replacement", BMC Chemical Biology, Biomed Central, London, GB, vol. 1, No. 1, Oct. 16, 2001 (Oct. 16, 2001), p. 3.
O. Danilchanka, J. J. Mekalanos, Cyclic dinucleotides and the innate immune response. Cell 154, 962-970 (2013).
Q. Chen, L. Sun, Z. J. Chen, Regulation and function of the cGAS-Sting pathway of cytosolic DNA sensing. Nat Immunol 17, 1142-1149 (2016).
S. Patel, L. Jin, TMEM173 variants and potential importance to human biology and disease. Genes Immun, (2018).
S. M. Haag et al., Targeting Sting with covalent small-molecule inhibitors. Nature 559, 269-273 (2018).
S. Li et al., The Cyclopeptide Astin C Specifically Inhibits the Innate Immune CDN Sensor Sting. Cell Rep 25, 3405-3421 e3407 (2018).
T. Siu et al., Discovery of a Novel cGAMP Competitive Ligand of the Inactive Form of Sting. ACS Med Chem Lett 10, 92-97 (2019).
L. T. Khoo, L. Y. Chen, Role of the cGAS-Sting pathway in cancer development and oncotherapeutic approaches. EMBO Rep 19, (2018).
S. Tshori, E. Razin, H. Nechushtan, Amino-acyl tRNA synthetases generate dinucleotide polyphosphates as second messengers: functional implications. Top Curr Chem 344, 189-206 (2014).
Y. N. Lee, H. Nechushtan, N. Figov, E. Razin, The function of lysyl-tRNA synthetase and Ap4A as signaling regulators of MITF activity in FcepsilonRI-activated mast cells. Immunity 20, 145-151 (2004).
N. Yannay-Cohen et al., LysRS serves as a key signaling molecule in the immune response by regulating gene expression. Mol Cell 34, 603-611 (2009).
A. S. Marriott et al., NUDT2 Disruption Elevates Diadenosine Tetraphosphate (Ap4A) and Down-Regulates Immune Response and Cancer Promotion Genes. PLoS One 11, e0154674 (2016).
Y. Duan et al., A point-charge force field for molecular mechanics simulations of proteins based on condensed-phase quantum mechanical calculations. J Comput Chem 24, 1999-2012 (2003).
Y. N. Lee, E. Razin, Nonconventional involvement of LysRS in the molecular mechanism of USF2 transcriptional activity in FcepsilonRI-activated mast cells. Mol Cell Biol 25, 8904-8912 (2005).
A. Krakowiak et al., Evaluation of influence of Ap4A analogues on Fhit-positive HEK293T cells; cytotoxicity and ability to induce apoptosis. Bioorg Med Chem 19, 5053-5060 (2011).

(Continued)

*Primary Examiner* — Patrick T Lewis
(74) *Attorney, Agent, or Firm* — WCF IP

(57) ABSTRACT

The present invention relates to compounds of formula (I), their diastereoisomers and their salts, for use for inhibiting cancer-related inflammation, notably via STING interaction.

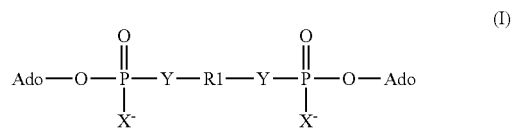

16 Claims, 10 Drawing Sheets
Specification includes a Sequence Listing.

(56) References Cited

OTHER PUBLICATIONS

M. A. Lee-Kirsch, The Type I Interferonopathies. Annu Rev Med 68, 297-315 (2017).
Y. W. Lim, L. A. Sanz, X. Xu, S. R. Hartono, F. Chedin, Genome-wide DNA hypomethylation and RNA:DNA hybrid accumulation in Aicardi-Goutieres syndrome. Elife 4, (2015).
S. B. Kwon, J. E. Yu, C. Park, J. Lee, B. L. Seong, Nucleic Acid-Dependent Structural Transition of the Intrinsically Disordered N-Terminal Appended Domain of Human Lysyl-tRNA Synthetase. Int J Mol Sci 19, (2018).
I. X. Wang et al., Human proteins that interact with RNA/DNA hybrids. Genome Res 28, 1405-1414 (2018).
M. P. Deutscher, The eucaryotic aminoacyl-tRNA synthetase complex: suggestions for its structure and function. J Cell Biol 99, 373-377 (1984).
R. E. Rigby et al., RNA:DNA hybrids are a novel molecular pattern sensed by TLR9. EMBO J 33, 542-558 (2014).
C. Langevin et al., The antiviral innate immune response in fish: evolution and conservation of the IFN system. J Mol Biol 425, 4904-4920 (2013).
G. Hartmann, Nucleic Acid Immunity. Adv Immunol 133, 121-169 (2017).
C. Bregnard et al., Upregulated Line-1 Activity in the Fanconi Anemia Cancer Susceptibility Syndrome Leads to Spontaneous Pro-inflammatory Cytokine Production. EBioMedicine 8, 184-194 (2016).
F. Coquel et al., SAMHD1 acts at stalled replication forks to prevent interferon induction. Nature 557, 57-61 (2018).
A. A. Duchon et al., HIV-1 Exploits a Dynamic Multi-aminoacyl-tRNA Synthetase Complex to Enhance Viral Replication. J Virol 91, (2017).
A. Motzik, H. Nechushtan, S. Y. Foo, E. Razin, Non-canonical roles of lysyl-tRNA synthetase in health and disease. Trends Mol Med 19, 726-731 (2013).
(W.J. Stec, B. Karwowski, M. Boczkowska, P. Guga, M. Koziolkiewicz, M. Sochacki, M.W. Wieczorek, J. Błaszczyk, Deoxyribonucleoside 3'-O-(2-Thio- and 2-Oxo-"spiro"-4,4-pentamethylene-1,3,2-oxathiaphospholane)s: Monomers for Stereocontrolled Synthesis of Oligo(deoxyribonucleoside phosphorothioate)s and Chimeric PS/PO Oligonucleotides ; J. Am. Chem. Soc. 1998, 120, 29, 7156-7167).
Walkowiak B, Baraniak J, Cierniewski CS, Stec W. Inhibition of ADP-triggered blood platelet aggregation by diadenosine polyphosphate analogues. Bioorg Med Chem Lett.Aug. 5, 2002;12(15):1959-62.

* cited by examiner

Figure 3:
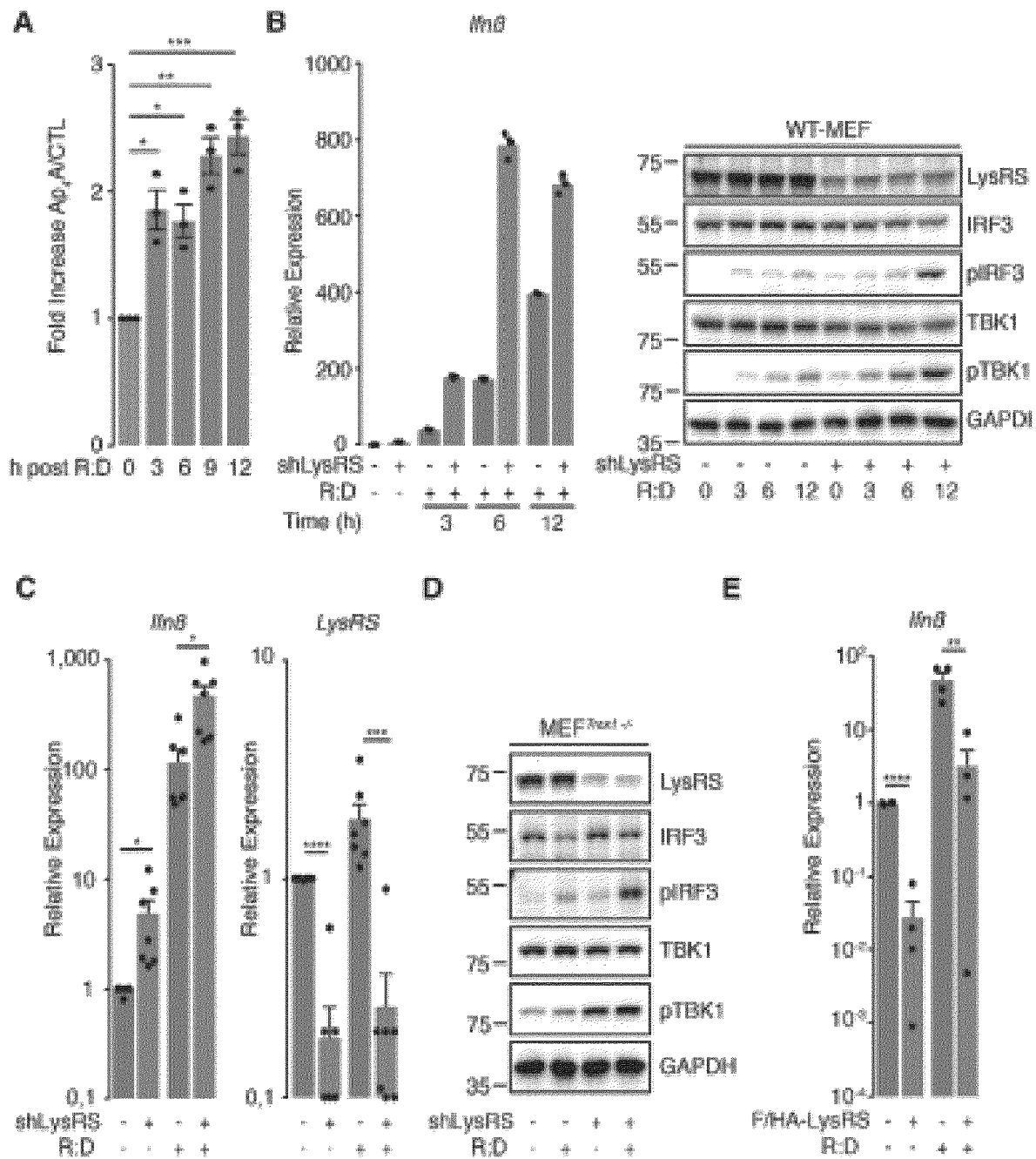

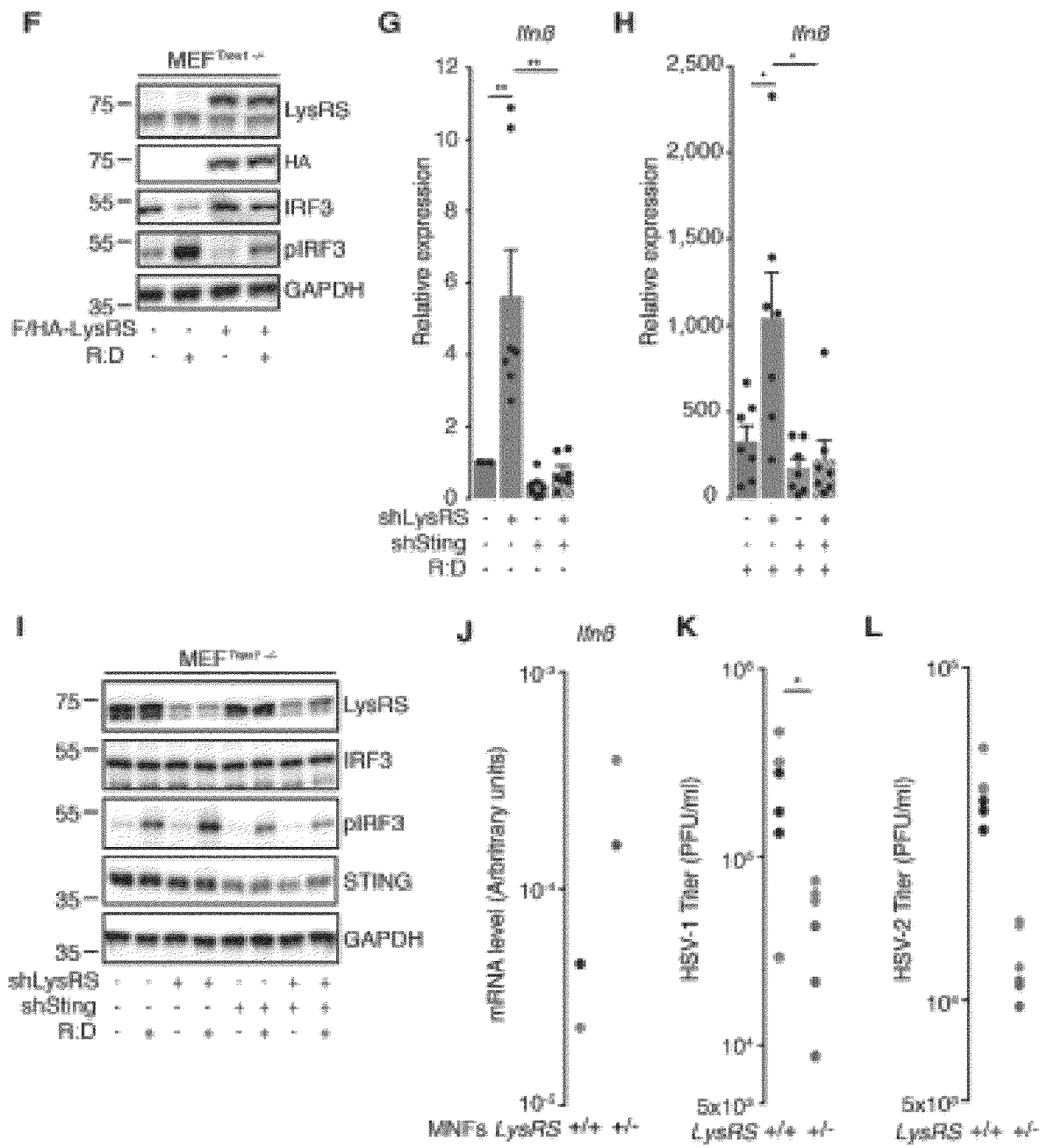
FIG.3 End

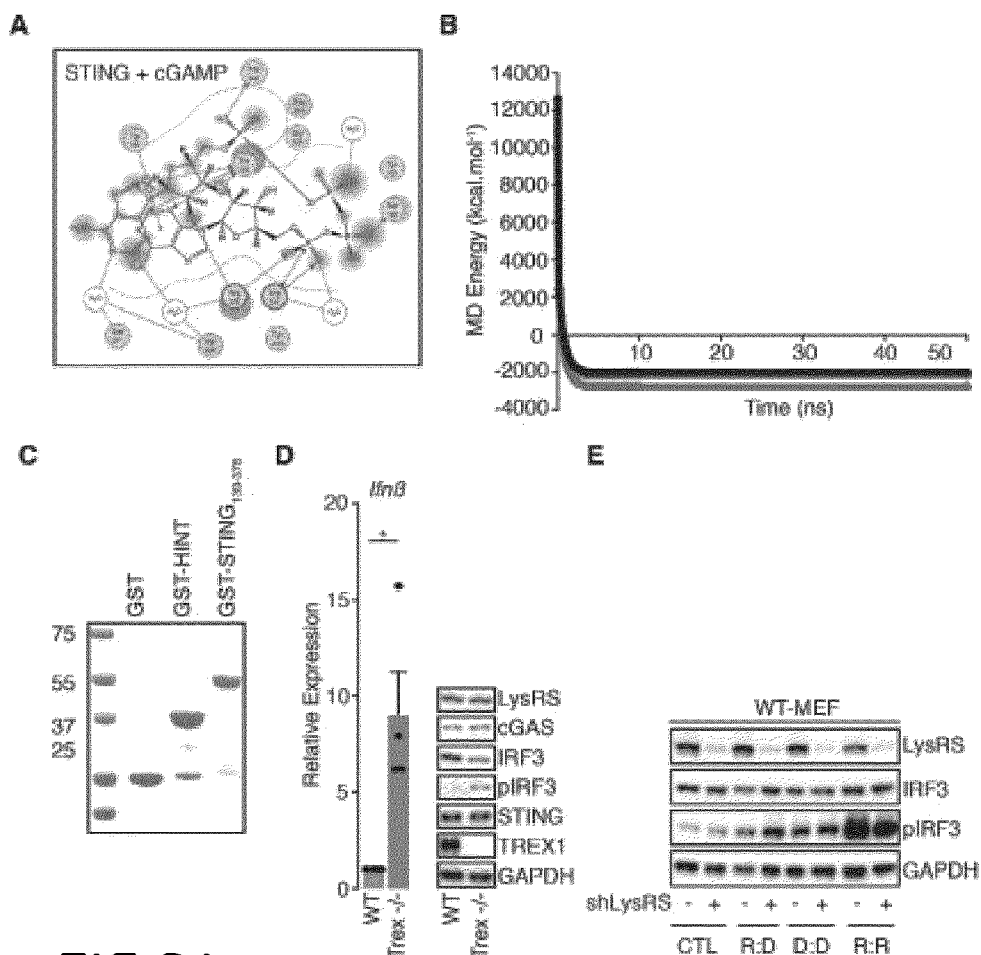
FIG.S1
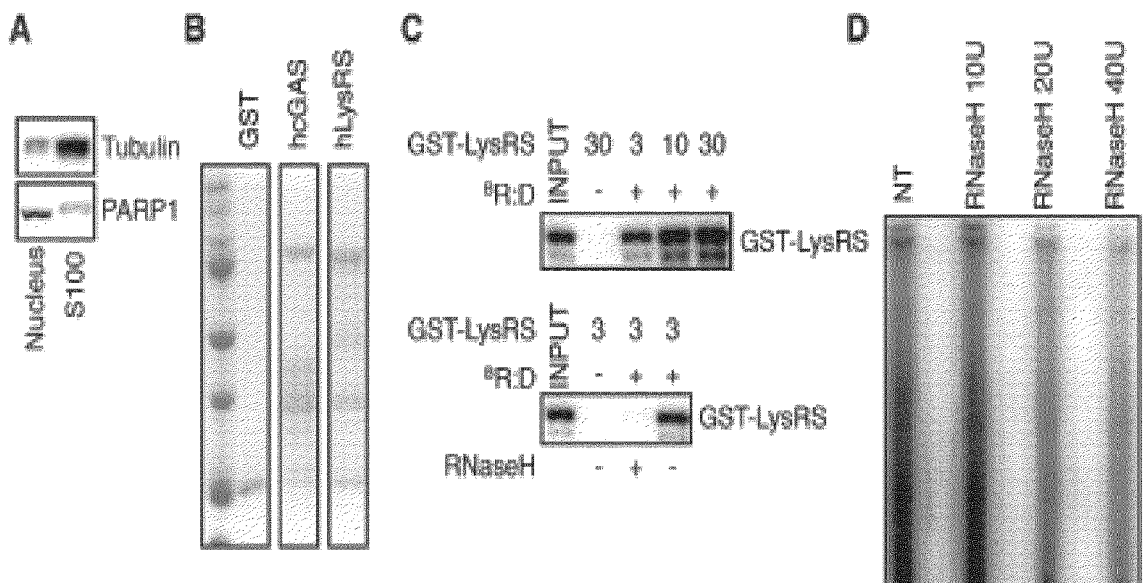
FIG.S2

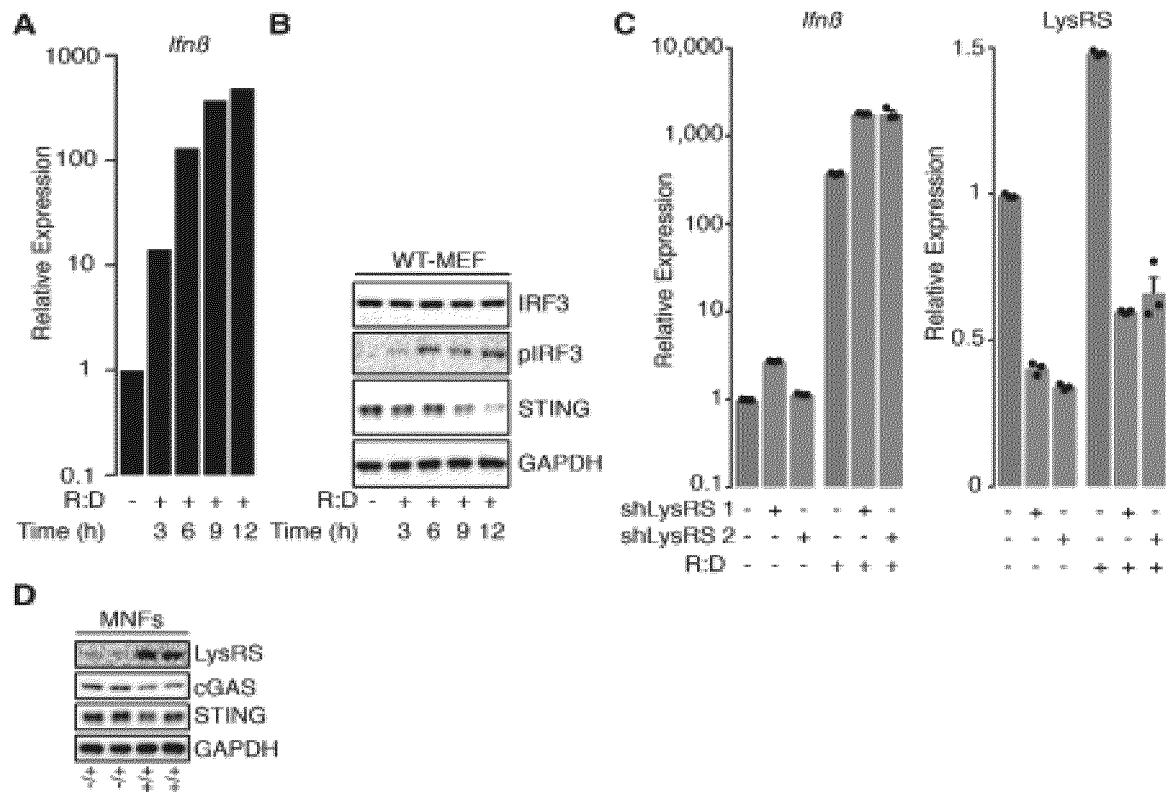
FIG.S3

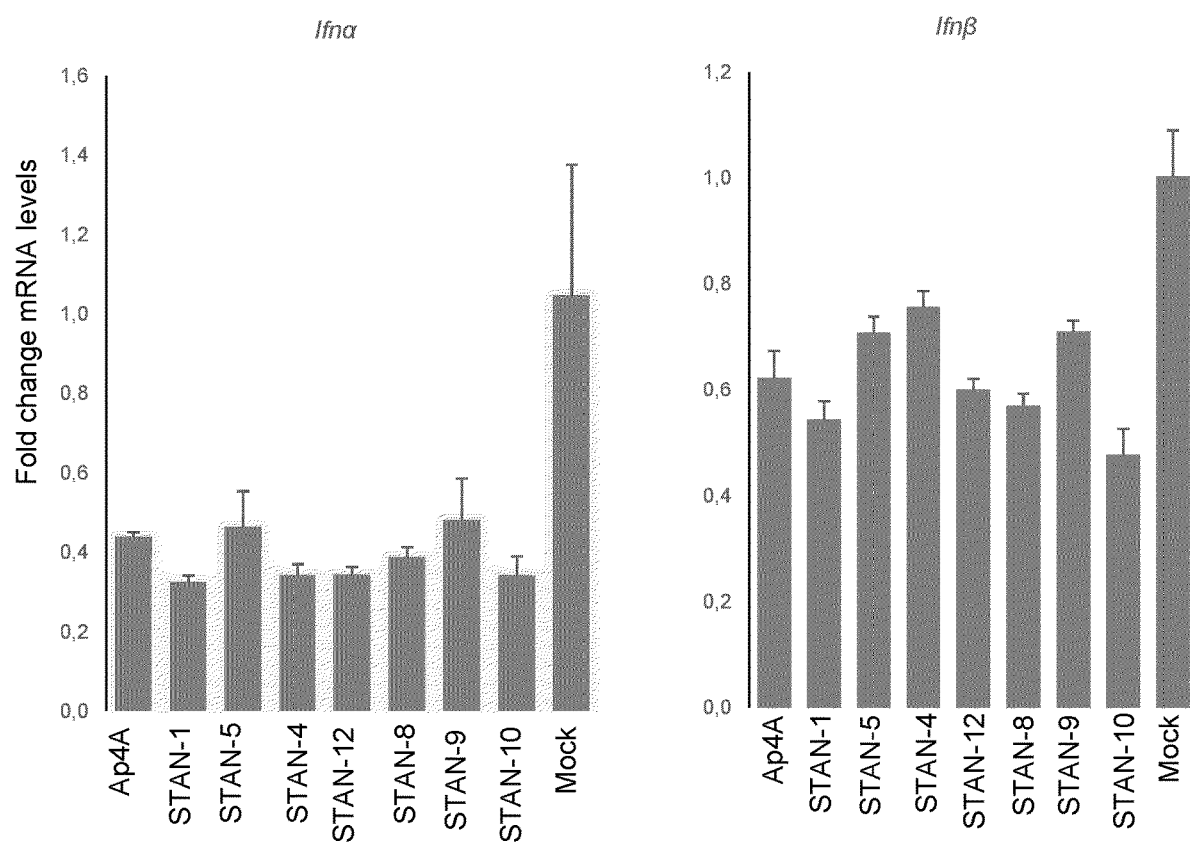
FIG.S4

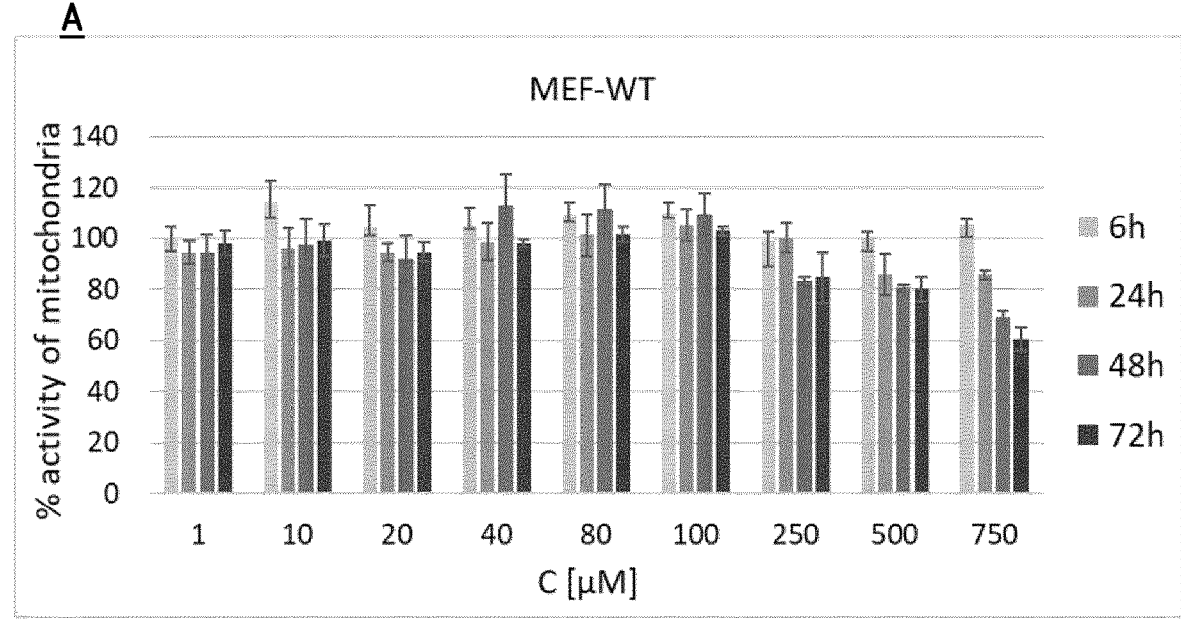
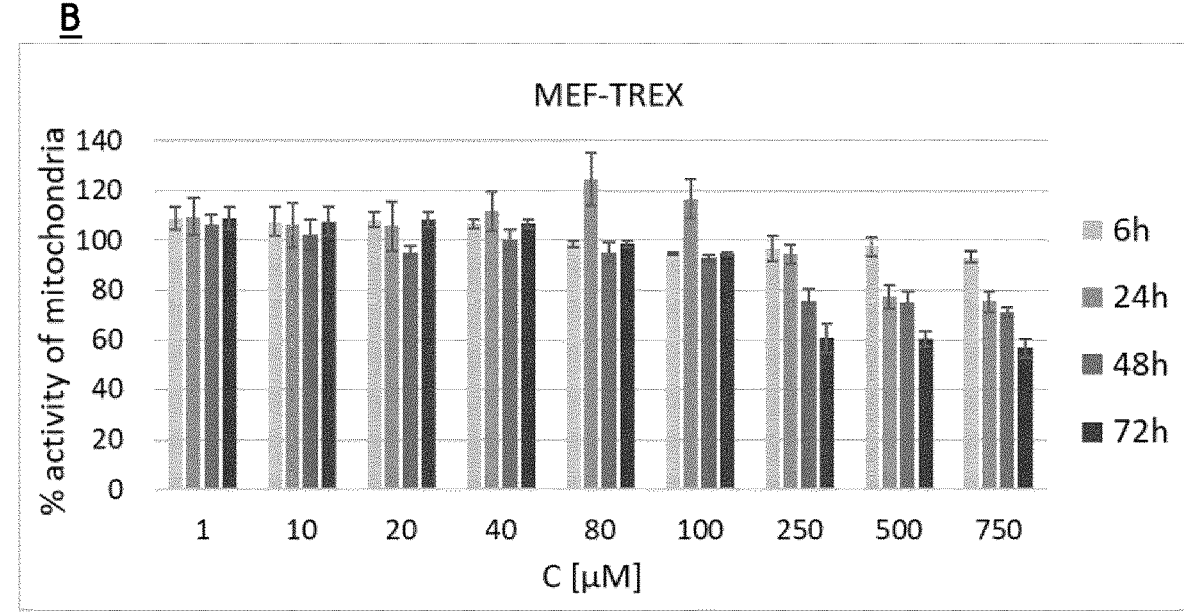
FIG.S5

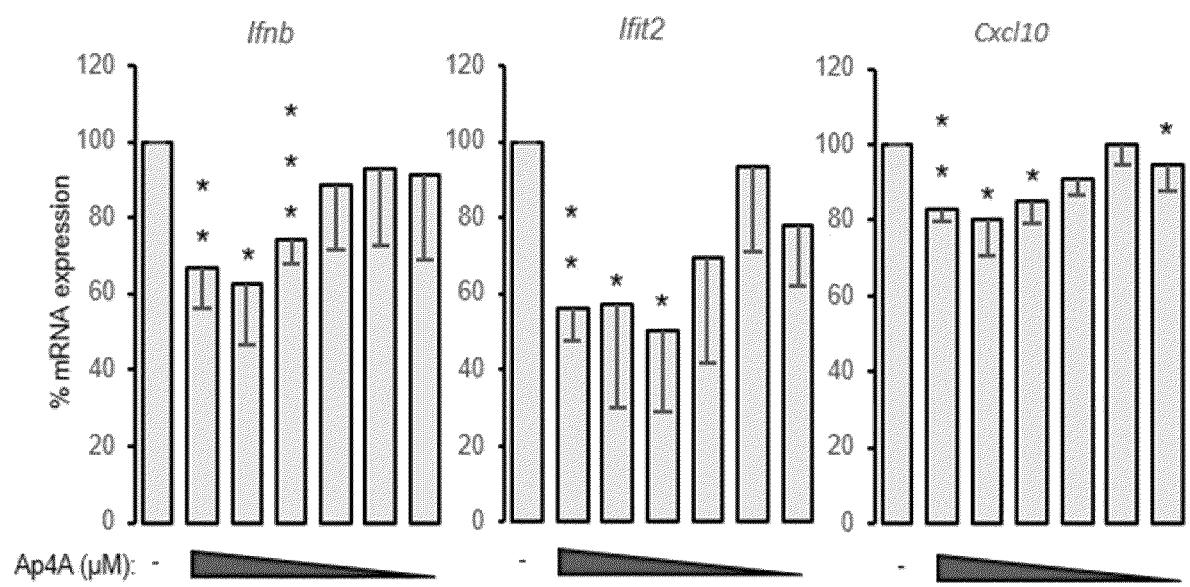
FIG.S6

STING INHIBITORS AND THEIR THERAPEUTIC USES

The present invention concerns the use of compounds of formula (I) and their salts, in the form of the mixture of their diastereoisomers or individual diastereoisomer, for inhibiting cancer-related inflammation.

Dinucleotides are bioactive molecules for which a signaling role in mammalian cells has emerged in recent years. In particular, cyclic dinucleotides, such as cyclic GMP-AMP (cGAMP), have been described as activators of the inflammatory response (1). Cellular cGAMP is produced by the cyclic DNA sensor GMP-AMP Synthase (cGAS), following its interaction with immune-stimulatory nucleic acids, including ssDNA, dsDNA and RNA:DNA hybrids. Subsequent interaction of cGAMP with the Stimulator of Interferon Genes (STING, also known as transmembrane protein 173 or TMEM173) triggers a signaling cascade that culminates with the production of pro-inflammatory cytokines and type I interferon (IFN). Consequently, dysregulation of this pathway fuels several inflammatory human pathologies, including autoimmune, auto-inflammatory and malignant disorders (2).

The development of therapeutic means to influence the cGAS-STING signaling pathway is of particular interest, notably in the light of immune-stimulatory nucleic acids arising from non-pathological situations. Indeed, several physiological processes can generate nucleic acid species by-products that, in absence of regulatory mechanisms, elicit inflammatory responses and foster inflammatory pathologies (2).

Likewise, uncontrolled activation of STING leads to chronic inflammation, which is key in many human pathologies such as autoimmune diseases and cancer.

Small molecules that associate with STING to prevent its activation have been identified recently through screening approaches (4, 5) or using in silico modelling (6). However, in certain pathologies, what determines the outcome of STING activation or inhibition remains unknown (7).

Therefore, there is a need for the development of novel and efficient therapies targeting STING, especially focusing on inhibiting STING activation.

Particularly, there is a need for novel and efficient anti-cancer drugs useful for preventing and/or treating cancer-related inflammation.

The present invention proposes compounds of formula (I) which aim to solve these needs:

Indeed, the compounds of the invention, of formula (I), are analogs of diadenosine tetraphosphate (Ap4A).

Diadenosine tetraphosphate (Ap4A) is abundantly produced by the Lysyl-tRNA synthetase (LysRS) upon immunological stress (9, 10). The inventors have now found that Ap4A produced by LysRS suppresses inflammatory responses through inhibition of STING-dependent signaling.

Thus, the compounds of the present invention are able to inhibit STING-dependent signaling, and can be expected to decrease cancer-related inflammation.

Consequently, the present invention relates to a compound chosen from compounds of formula (I), their diastereoisomers and their salts, for use for inhibiting inflammation. Preferably, the present invention relates to a compound chosen from compounds of formula (I), their diastereoisomers and their salts, for use for inhibiting cancer-related inflammation.

Another object of the invention relates to a compound chosen from compounds of formula (II), their diastereoisomers and their salts.

Another object of the invention relates to a composition comprising, in a pharmaceutically acceptable medium, at least one compound of formula (II), one of its diastereoisomers or one of its salts.

Another object of the invention also relates to the use of a compound of formula (II), one of its diastereoisomers or one of its salts as a medicament.

Another object of the invention also relates to the use of a compound of formula (II), one of its diastereoisomers or one of its salts as an anti-inflammatory agent.

According to a first aspect, the present invention relates to a compound chosen from compounds of formula (I), their diastereoisomers and their salts, for use for inhibiting inflammation, especially cancer-related inflammation.

The compounds of formula (I) are the following:

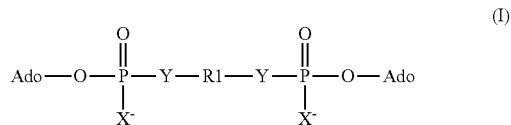
(I)

wherein:
X is an oxygen or sulfur atom,
Y is an oxygen or sulfur atom or —NH— group,
Ado is the adenosine residue,
R1 is chosen from the following groups:

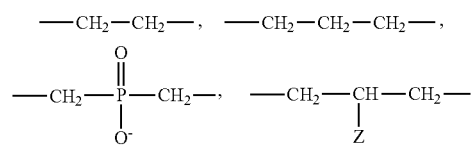

wherein Z is —OH, —OP(S)(OAdo)(OH), $N_3$, $NH_2$, —$CH_3$ or

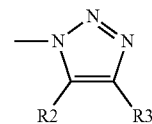

wherein R2 and R3 each represents a C1-C6 alkyl group or an aryl group,

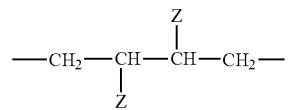

wherein Z represents —OH or —OP(O)(OH)$_2$,

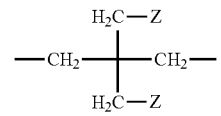

wherein Z represents —OH, —OP(O)(OH)$_2$ or —OP(O)(OH)(OAdo),

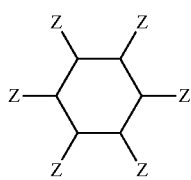

wherein Z represents a covalent bond, H, —OH or a C1-C6 alkyl group,

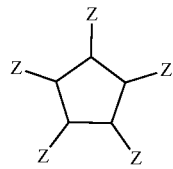

wherein Z represents a covalent bond, H, —OH or a C1-C5 alkyl group.

In the last two definitions of R1, when Z is a covalent bond, it means that the cycloalkane is directly linked to Y. Of course, preferably, at least two Z substituents, each representing a covalent bond, so that R1 is linked to each Y to give formula (I).

By "C1-C6 alkyl", it is meant a linear hydrocarbon group comprising from 1 to 6 carbon atoms, or a branched hydrocarbon group comprising from 3 to 6 carbon atoms. Examples of C1-C6 alkyl groups include methyl, ethyl, n-propyl, isopropyl, n-butyl, isobutyl, tert-butyl, n-pentyl, isopentyl and n-hexyl groups, and preferably methyl, n-butyl, n-pentyl, n-hexyl, isopropyl or tert-butyl. More preferably, the C1-C6 alkyl is methyl or isopropyl.

By "C1-C5 alkyl", it is meant a linear hydrocarbon group comprising from 1 to 5 carbon atoms, or a branched hydrocarbon group comprising from 3 to 5 carbon atoms. Examples of C1-C5 alkyl groups include methyl, ethyl, n-propyl, isopropyl, n-butyl, isobutyl, tert-butyl, n-pentyl and isopentyl groups, and preferably methyl, n-butyl, n-pentyl, isopropyl or tert-butyl. More preferably, the C1-C5 alkyl is methyl or isopropyl.

By "aryl", it is meant a monocyclic or polycyclic aromatic hydrocarbon group, which may be optionally substituted. Preferably, the aryl group is a phenyl. The aryl may be substituted by at least one alkyl group. A preferred example of aryl group is phenyl.

The adenosine residue (Ado) is the residue represented by the following formula (A):

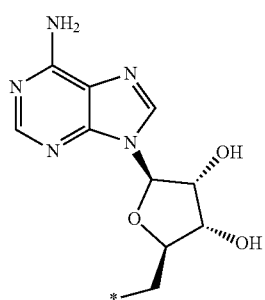

(A)

Said residue is linked to the compound of formula (I) on the oxygen (links indicated by stars on the above formula). Thus, said residue is linked to the oxygen of the compound of formula (I) thanks to the carbon 5' of the ribose residue.

In other words, the compounds of formula (I) are as follows:

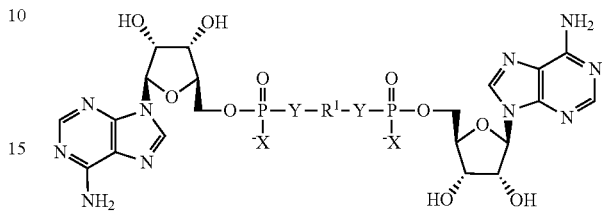

By "salt", it is meant a pharmaceutically acceptable salt. Such salts correspond to any salt of a compound of formula (I) with a base.

By "diastereoisomer", it is meant a type of stereoisomer. Specifically, diastereoisomers are compounds which are non-mirror image non-identical stereoisomers. The compounds of the invention may be used either as diastereoisomeric mixtures, or as their individual diastereoisomers.

Preferably, the compound is chosen from compounds of formula (I), their diastereoisomers and their salts, wherein:

X is an oxygen or sulfur atom,

Y is an oxygen or sulfur atom or —NH—,

Ado is the adenosine residue,

R1 is chosen from the following groups:

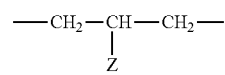

wherein Z is $N_3$ or

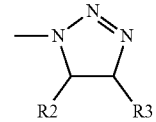

wherein R2 and R3 each represents a C1-C6 alkyl group or an aryl group,

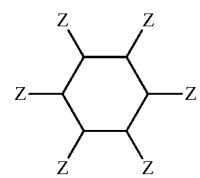

wherein Z represents a covalent bond, H, —OH or a C1-C6 alkyl group,

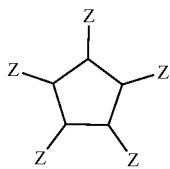

wherein Z represents a covalent bond, H, —OH or a C1-C5 alkyl group.

Alternatively, preferably, the compound is chosen from compounds of formula (I), their diastereoisomers and their salts, wherein:

X is an oxygen or sulfur atom,

Y is an oxygen or sulfur atom or —NH—,

Ado is the adenosine residue,

R1 is chosen from the following groups:

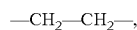

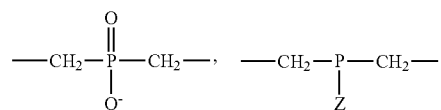

wherein Z is —OH, —OP(S)(OAdo)(OH) or —CH$_3$,

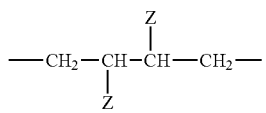

wherein Z represents —OH,

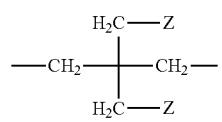

wherein Z represents —OP(O)(OH)$_2$ or —OP(O)(OH)(OAdo).

Preferably, the compound of formula (I) is such that:
X is a sulfur atom,
Y is an oxygen,
Ado is the adenosine residue, and
R1 is

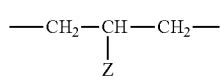

wherein Z is —OH.

Said compound is STAN-1 («STAN» for STING ANtagonist):

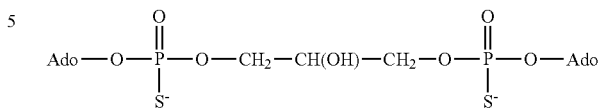

Preferably, the compound of formula (I) is such that:
X is a sulfur atom,
Y is an oxygen,
Ado is the adenosine residue, and
R1 is

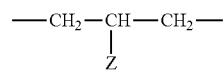

wherein Z is —CH$_3$.

Said compound is STAN-2:

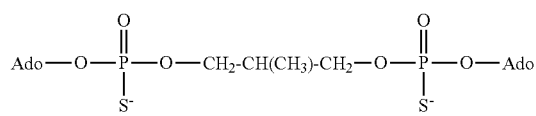

Preferably, the compound of formula (I) is such that:
X is a sulfur atom,
Y is an oxygen,
Ado is the adenosine residue, and
R1 is

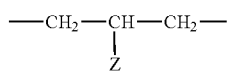

wherein Z is —OP(S)(OAdo)(OH).

Said compound is STAN-3:

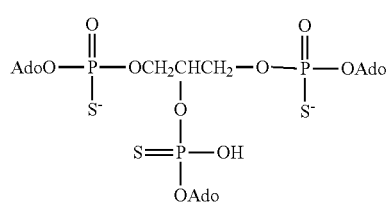

Preferably, the compound of formula (I) is such that:
X is a sulfur atom,
Y is an oxygen,
Ado is the adenosine residue, and
R1 is —CH$_2$—CH$_2$—CH$_2$—.

Said compound is STAN-4:

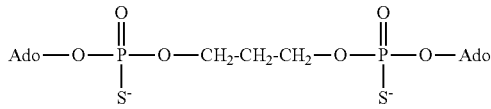

Preferably, the compound of formula (I) is such that:
X is an oxygen,
Y is an oxygen,
Ado is the adenosine residue, and
R1 is —CH$_2$—CH$_2$—CH$_2$—.
Said compound is STAN-5:

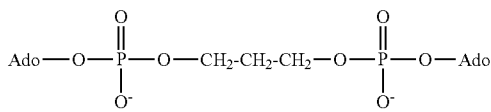

Preferably, the compound of formula (I) is such that:
X is a sulfur,
Y is —NH—,
Ado is the adenosine residue, and
R1 is —CH$_2$—CH$_2$—CH$_2$—.
Said compound is STAN-6:

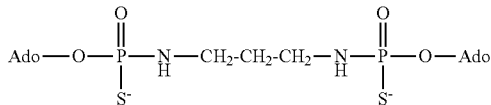

Preferably, the compound of formula (I) is such that:
X is an oxygen,
Y is —NH—,
Ado is the adenosine residue, and
R1 is —CH$_2$—CH$_2$—CH$_2$—.
Said compound is STAN-7:

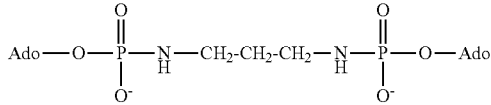

Preferably, the compound of formula (I) is such that:
X is a sulfur,
Y is an oxygen,
Ado is the adenosine residue, and
R1 is —CH$_2$—CH$_2$—.
Said compound is STAN-8:

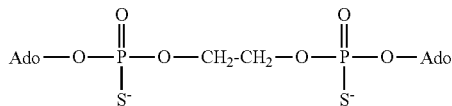

Preferably, the compound of formula (I) is such that:
X is an oxygen,
Y is an oxygen,
Ado is the adenosine residue, and
R1 is

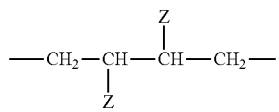

wherein Z represents —OH.

Said compound is STAN-9:

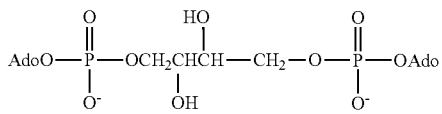

Preferably, the compound of formula (I) is such that:
X is an oxygen,
Y is an oxygen,
Ado is the adenosine residue, and
R1 is

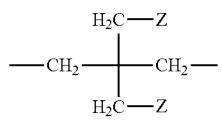

wherein Z represents —OP(O)(OH)(OAdo).

Said compound is STAN-10:

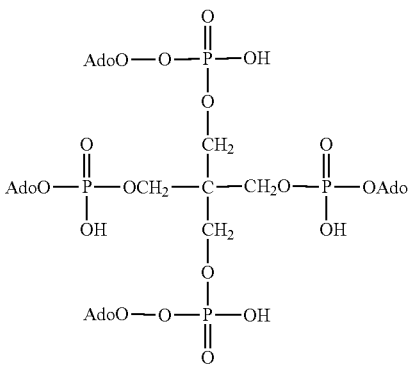

Preferably, the compound of formula (I) is such that:
X is an oxygen,
Y is an oxygen,
Ado is the adenosine residue, and
R1 is

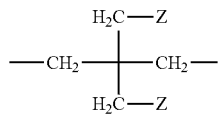

wherein Z represents —OP(O)(OH)$_2$.

Said compound is STAN-11:

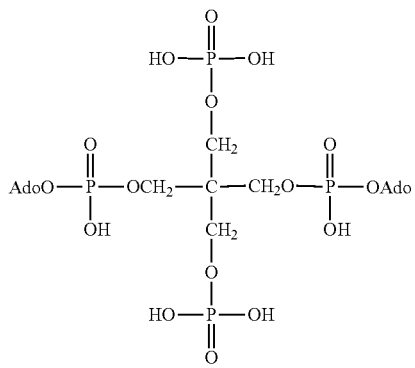

Preferably, the compound of formula (I) is such that:
X is a sulfur,
Y is an oxygen,
Ado is the adenosine residue, and
R1 is

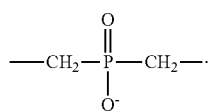

Said compound is STAN-12:

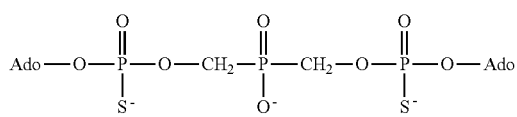

As shown in the examples, the compounds of formula (I), their diastereoisomers and their salts of the invention are chosen from:

STAN-1

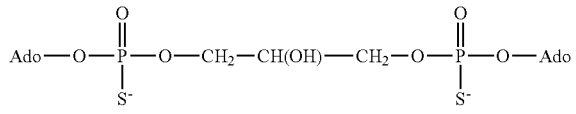

STAN-4

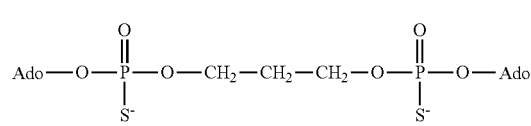

STAN-5

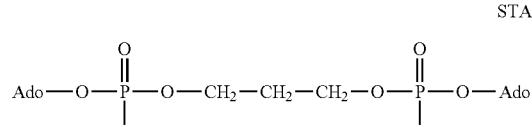

STAN-12

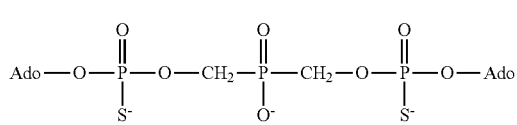

STAN-8

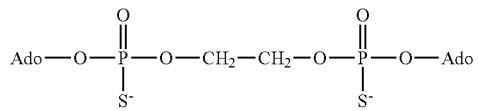

STAN-9

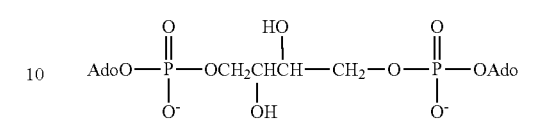

and

STAN-10

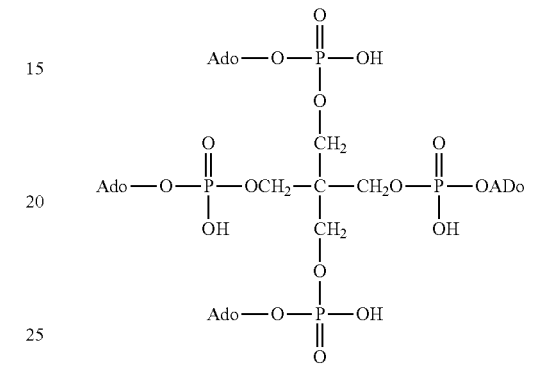

Novel Compounds

According to another embodiment, the invention relates to a compound chosen from compounds of formula (II), their diastereoisomers and their salts.

Another object of the invention relates to a composition comprising, in a pharmaceutically acceptable medium, at least one compound of formula (II), their diastereoisomers and their salts.

Another object of the invention also relates to the use of a compound of formula (II), one or more of its diastereoisomers or one of its salts as a medicament.

Another object of the invention also relates to the use of a compound of formula (II), one of its diastereoisomers or one of its salts as an anti-inflammatory agent.

The compounds of formula (II) are the following:

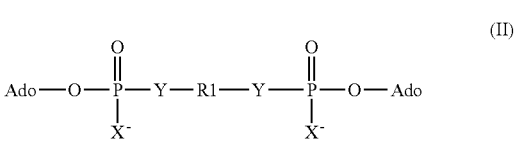 (II)

wherein:

X is an oxygen or sulfur atom,

Y is an oxygen or sulfur atom or —NH— group,

Ado is the adenosine residue,

R1 is chosen from the following groups:

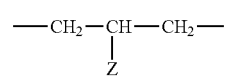

wherein Z is $N_3$ or

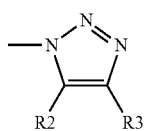

wherein R2 and R3 each represents a C1-C6 alkyl group or an aryl group,

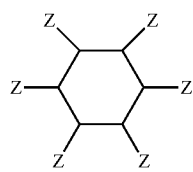

wherein Z represents a covalent bond, H, —OH or a C1-C6 alkyl group,

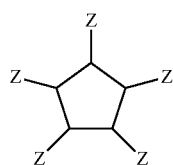

wherein Z represents a covalent bond, H, —OH or a C1-C5 alkyl group.

When Z is a covalent bond, it means that the cycloalkane is directly linked to Y. Of course, preferably, at least two Z represent a covalent bond, so that R1 is linked to each Y group of formula (II).

In other words, thanks to the definition of the adenosine residue as indicated above, the compounds of formula (II) are as follows:

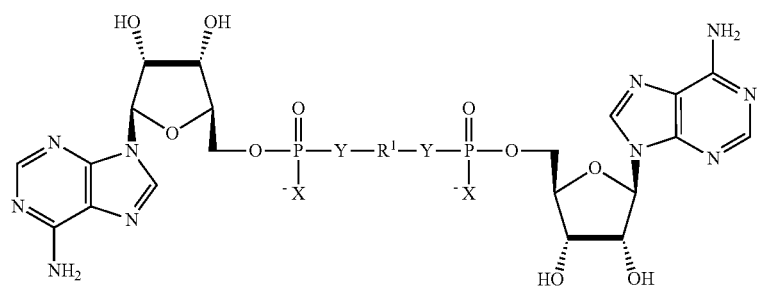

Formula (II) is a subgroup of formula (I).

Preparation of the Compounds of the Invention

The compounds of the invention may be prepared by the following process:

General procedure for the synthesis of compounds of Formula I (Approach A): The approach A for the synthesis of compounds described by Formula I is based on the phosphorothioylation of hydroxyl function of polyols of general structure HO—R1-OH (1 eq.) with $N^6,O^{2'},O^{3'}$-tribenzoyl- or $N^6,N^6,O^{2'},O^{3'}$-tetrabenzoyl-adenosine-3'-O-(2-thiono-1,3,2-oxathiaphospholane) (2 eq. or eventually with 1 eq. for each hydroxyl group of polyol, as in the case where R1=$CH_2C(CH_2OH)_2CH_2$), followed by the respective removal of the protecting groups and purification of the final compounds by ion-exchange chromatography (W. J. Stec, B. Karwowski, M. Boczkowska, P. Guga, M. Koziolkiewicz, M. Sochacki, M. W. Wieczorek, J. Blaszczyk, Deoxyribonucleoside 3'-O-(2-Thio- and 2-Oxo-"spiro"-4,4-pentamethylene-1,3,2-oxathiaphospholane)s: Monomers for Stereocontrolled Synthesis of Oligo(deoxyribonucleoside phosphorothioate)s and Chimeric PS/PO Oligonucleotides; J. Am. Chem. Soc. 1998, 120, 29, 7156-7167).

For example, STAN-1 was obtained according to the following procedure: $N^6,O^{2'},O^{3'}$-tribenzoyladenosine (scheme 1) (3 mmol) was reacted with an excess of 2-chloro-1,3,2-oxathiaphospholane (4 mmol) in pyridine in the presence of an excess of elemental sulfur (5 mmol) for 12 h at room temperature. The resulting $N^6,O^{2'},O^{3'}$-tribenzoyladenosine-3'-O-(2-thiono-1,3,2-oxathiaphospholane) (2 eq.) was isolated from the reaction mixture by silica gel column chromatography and used for the condensation with glycerol (HO—$CH_2CH(OH)CH_2OH$, R1=$CH_2CH(OH)CH_2$) (1 eq.) in the presence of DBU (1,8-diazabicyclo(5,4,0) undec-7-ene, 2 eq.) in dry acetonitrile, for 4 h. After removal of solvent under reduced pressure the remaining oil was dissolved in aqueous ammonia (28%) and kept for 24 h at room temperature. After removal of solvent the crude reaction mixture was poured on the Sephadex A-25 column and the desired product was isolated by elution with linear gradient of ammonium bicarbonate (pH 7.5) from 0.2 to 1 M, lyophilized (40% total yield) and the structure of STAN-1 was confirmed by $^{31}P$ NMR, and MALDI-TOF MS.

Scheme 1. The synthesis of STAN-1 by approach A (oxathiaphosphothioylation of $N^6,O^{2'},O^{3'}$-tribenzoyladenosine followed by the reaction of $N^6,O^{2'},O^{3'}$-tribenzoyladenosine-3'-O-(2-thiono-1,3,2-oxathiaphospholane) with glycerol, and subsequent removal of benzoyl groups from protected STAN-1)

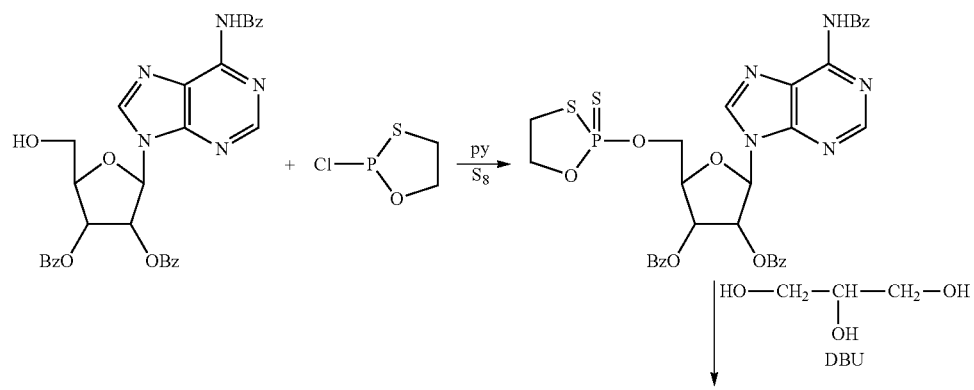

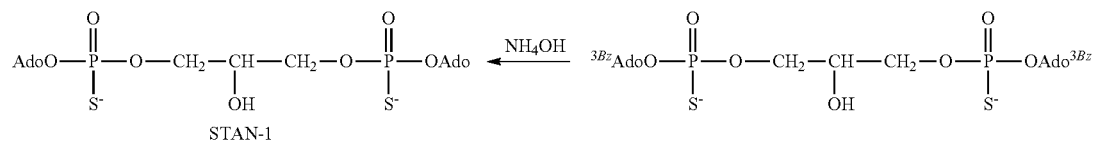

STAN-1

Compounds of Formula I with Y=—NH— (STAN-6 and STAN-7) were obtained analogously by condensation of $N^6,N^6,O^{2'},O^{3'}$-tetrabenzoyl-adenosine-3'-O-(2-thiono-1,3,2-oxathia-phospholane) (2 eq.) with the 1,3-diaminopropane (1 eq.), while compound STAN-12 was obtained by condensation of $N^6,N^6,O^{2'},O^{3'}$-tetrabenzoyladenosine-3'-O-(2-thiono-1,3,2-oxathiaphospholane) (2 eq.) with the O-methyl bis-(hydroxymethyl)-phosphinate (R1=CH$_2$P(O)(OH)CH$_2$) (1 eq.). The desired products of Formula I we subjected to the respective removal of the protecting groups and purification by ion-exchange chromatography.

General procedure for the synthesis of compounds of Formula I (Approach B): Alternatively, the approach B for the synthesis of compounds described by Formula I is based on the phosphorothioylation of hydroxyl function of polyols of general structure HO-R1-OH (1 eq.) with an excess of 2-chloro-1,3,2-oxathiaphospholane, followed by its sulfurization, and subsequent reaction with $N^6,O^{2'}$, $O^{3'}$_tribenzoyl- or $N^6,N^6,O^{2'},O^{3'}$-tetrabenzoyladenosine.

For example, STAN-3 was obtained by treatment of glycerol (1.0 mmol) dissolved in pyridine (1 ml) with 2-chloro-1,3,2-oxathiaphospholane (3.6 mmol) and elemental sulfur (5 mmol) in pyridine (3 ml) (scheme 2). The reaction mixture was stirred for 12 h at room temperature. Crude product was purified by silica gel column chromatography using chloroform: hexane (7:3) to give the desired tri-oxathiaphosphothioylated glycerol in 77% yield. Condensation of oxathiaphospholane derivative of glycerol (1 eq) with $N^6,O^{2'},O^{3'}$-tribenzoyladenosine (3 eq.) in acetonitrile in the presence of DBU (3 eq.) (4 h, room temperature), followed by solvent evaporation and removal of the protecting groups in basic conditions (28% aqueous ammonia, 24 h, room temperature) delivered crude STAN-3, which was purified by Sephadex A-25 ion-exchange chromatography using a linear gradient of ammonium bicarbonate buffer (pH 7.5) from 0.2 to 1M as eluent (60% yield), and its structure was confirmed spectrally ($^{31}$P NMR and MALDI-TOF mass spectrometry).

Scheme 2. Synthetic pathway of preparation of STAN-3 by Approach B (oxathiaphosphothioylation of glycerol, followed by its reaction with N⁶,O²',O³'-tribenzoyladenosine, and subsequent removal of benzoyl groups from protected STAN-3)

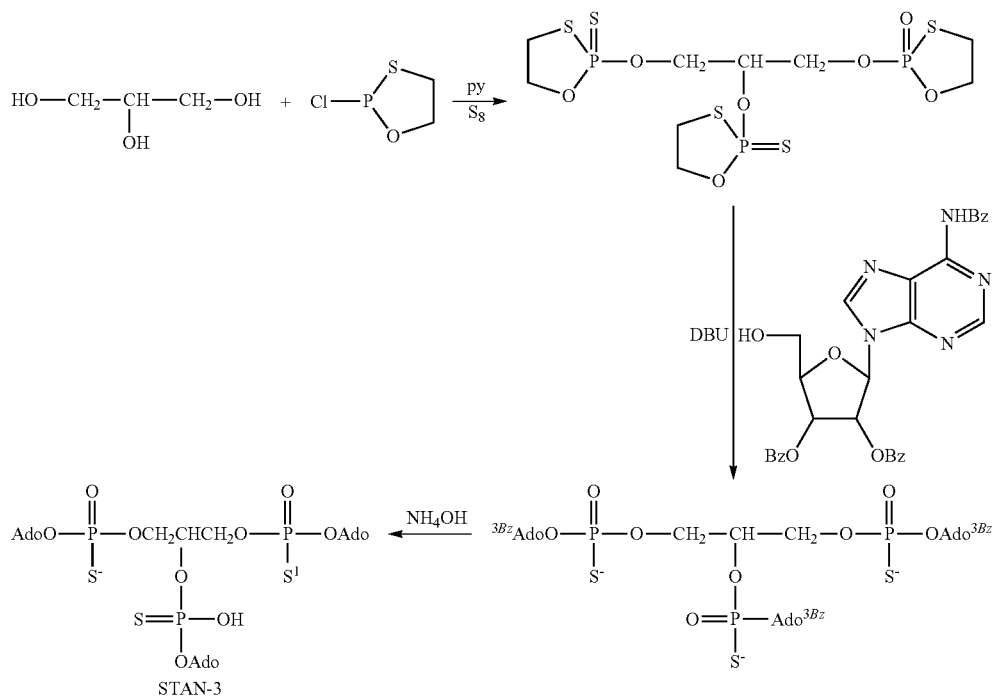

Use

The compounds of formula (I), their diastereoisomers and their salts of the invention may be used for preventing and/or treating cancer. Particularly, the compounds of formula (I), their diastereoisomers and their salts are for use for inhibiting cancer-related inflammation.

The compounds of formula (I), their diastereoisomers and their salts are especially used for inhibiting inflammation, via interaction with STING. Particularly, the compounds of formula (I), their diastereoisomers and their salts are used for inhibiting cancer-related inflammation, via interaction with STING. Indeed, the compounds of formula (I), their diastereoisomers and their salts are analogs of the endogenous ligand Ap4A, but are not hydrolysable. Thus, they are able to mimic the effects of Ap4A when applied to cells, and therefore to inhibit the STING pathway, thereby preventing and/or decreasing the synthesis of pro-inflammatory cytokines and type I interferon.

By "inflammation", it is meant the inflammation that is triggered by activation of STING and that leads to type I interferon production. Said inflammation is typically triggered in the presence of pathological immune-stimulatory nucleic acids that can either be endogenous (i.e. resulting from mitochondrial or nuclear damage for example) or exogenous (i.e. pathogen-derived). It includes cancer-related inflammation, but also the inflammation component of inflammatory diseases such as lupus or Aicardi-Goutiéres syndrome. Preferably, the inflammation is cancer-related inflammation.

By "cancer-related inflammation", it is meant the inflammation which is due to cancer. Said inflammation is characterized by the presence of pro-inflammatory cytokines (such as CxCL10 and CCL5) and of type I interferon.

Particularly, the compounds of formula (I), their diastereoisomers and their salts are used for decreasing and/or inhibiting the production of type I interferon and/or pro-inflammatory cytokines (such as CxCL10 and CCL5) in cancer cells, via interaction with STING.

Preferably, the compounds of formula (I), their diastereoisomers and their salts are antagonists of STING.

By "antagonist", it is meant a compound which binds to STING, and subsequently which inhibits STING pathway, thereby decreasing and/or inhibiting the production of type I interferon and/or pro-inflammatory cytokines, such as CxCL10 and CCL5.

Typically, Ap4A is an antagonist of STING, which is endogenous.

By "preventing", it is meant avoiding the cancer to occur.

By "treatment", it is meant the curative treatment of cancer. A curative treatment is defined as a treatment that completely treat (cure) or partially treat cancer (i.e. induces tumor growth stabilization, retardation or regression).

The "subject" refers to any subject and typically designates a patient, preferably a subject undergoing a treatment of cancer such as immunotherapy, chemotherapy and/or radiotherapy. In any case, the subject is preferably a vertebrate, more preferably a mammal, even more preferably a human being.

By "cancer", it is meant any type of cancer. The cancer may be solid or non solid, and may be for example selected from a colon cancer, a colorectal cancer, a melanoma, a bone cancer, a breast cancer, a thyroid cancer, a prostate cancer, an ovarian cancer, a lung cancer, a pancreatic cancer, a glioma, a cervical cancer, an endometrial cancer, a head and neck cancer, a liver cancer, a bladder cancer, a renal cancer, a skin cancer, a stomach cancer, a testis cancer, an urothelial cancer or an adrenocortical carcinoma, leukemia but also non solid cancers such as lymphoma.

Preferably, the cancer is a breast cancer, a prostate cancer, a lung cancer, a liver cancer, a bone cancer, a bladder cancer or a leukemia.

Preferably, the cancer is pancreatic cancer.

Particularly, the compounds of formula (I), their diastereoisomers and their salts are for use for inhibiting cancer-related inflammation, especially for inhibiting pancreatic cancer-related inflammation.

The compound of formula (I), one of its diastereoisomers or one of its salts of the invention is preferably administered at a therapeutically effective amount or dose. As used herein, "a therapeutically effective amount or dose" refers to an amount of the compound of the invention which prevents, removes, slows down the disease, or reduces or delays one or several symptoms or disorders caused by or associated with said disease in the subject, preferably a human being. The effective amount, and more generally the dosage regimen, of the compound of the invention and pharmaceutical compositions thereof may be determined and adapted by the one skilled in the art. An effective dose can be determined by the use of conventional techniques and by observing results obtained under analogous circumstances. The therapeutically effective dose of the compound of the invention will vary depending on the disease to be treated or prevented, its gravity, the route of administration, any co-therapy involved, the patient's age, weight, general medical condition, medical history, etc.

Typically, the amount of the compound to be administered to a patient may range from about 0.01 to 500 mg/kg of body weight for a human patient. In a particular embodiment, the pharmaceutical composition according to the invention comprises 0.01 mg/kg to 300 mg/kg of the compound of the invention, preferably from 0.01 mg/kg to 3 mg/kg, for instance from 25 to 300 mg/kg.

In a particular aspect, the compounds of the invention can be administered to the subject by parenteral route, topical route, oral route or intravenous injection. The compound or the nanoparticle of the invention may be administered to the subject daily (for example 1, 2, 3, 4, 5, 6 or 7 times a day) during several consecutive days, for example during 2 to 10 consecutive days, preferably from 3 to 6 consecutive days. Said treatment may be repeated during 1, 2, 3, 4, 5, 6 or 7 weeks, or every two or three weeks or every one, two or three months. Alternatively, several treatment cycles can be performed, optionally with a break period between two treatment cycles, for instance of 1, 2, 3, 4 or 5 weeks. The compound of the invention can for example be administered as a single dose once a week, once every two weeks, or once a month. The treatment may be repeated one or several times per year. Doses are administered at appropriate intervals which can be determined by the skilled person. The amount chosen will depend on multiple factors, including the route of administration, duration of administration, time of administration, the elimination rate of the compound, or of the various products used in combination with said compound, the age, weight and physical condition of the patient and his/her medical history, and any other information known in medicine.

The administration route can be oral, topical or parenteral, typically rectal, sublingual, intranasal, intra-peritoneal (IP), intra-venous (IV), intra-arterial (IA), intra-muscular (IM), intra-cerebellar, intrathecal, intratumoral and/or intradermal. The pharmaceutical composition is adapted for one or several of the above-mentioned routes. The pharmaceutical composition is preferably administered by injection or by intravenous infusion of suitable sterile solutions, or in the form of liquid or solid doses via the alimentary canal.

The present invention also relates to a composition comprising, in a pharmaceutically acceptable medium, at least one compound of formula (I), one of its diastereoisomers or one of its salts according to the invention. Such a composition comprises a pharmaceutically acceptable medium (or carrier).

The carrier must be "acceptable" in the sense of being compatible with the other ingredients of the formulations and not deleterious to the recipient thereof.

The pharmaceutical composition can be formulated as solutions in pharmaceutically compatible solvents or as gels, oils, emulsions, suspensions, or dispersions in suitable pharmaceutical solvents or vehicles, or as pills, tablets, capsules, powders, suppositories, etc. that contain solid vehicles in a way known in the art, possibly through dosage forms or devices providing sustained and/or delayed release. For this type of formulation, an agent such as cellulose, lipids, carbonates or starches are used advantageously.

Agents or vehicles that can be used in the formulations (liquid and/or injectable and/or solid) are excipients or inert vehicles, i.e. pharmaceutically inactive and non-toxic vehicles.

Mention may be made, for example, of saline, physiological, isotonic and/or buffered solutions, compatible with pharmaceutical use and known to those skilled in the art. The compositions may contain one or more agents or vehicles chosen from dispersants, solubilizers, stabilizers, preservatives, etc.

Particular examples are methylcellulose, hydroxymethylcellulose, carboxymethylcellulose, cyclodextrins, polysorbate 80, mannitol, gelatin, lactose, liposomes, vegetable oils or animal, acacia, etc. Preferably, vegetable oils are used.

Formulations of the present invention suitable for oral administration may be in the form of discrete units as capsules, sachets, tablets or lozenges, each containing a predetermined amount of the active ingredient; in the form of a powder or granules; in the form of a solution or a suspension in an aqueous liquid or non-aqueous liquid; or in the form of an oil-in-water emulsion or a water-in-oil emulsion.

Formulations suitable for parenteral administration conveniently comprise a sterile oily or aqueous preparation of the active ingredient which is preferably isotonic with the blood of the recipient. Every such formulation can also contain other pharmaceutically compatible and non-toxic auxiliary agents, such as, e.g. stabilizers, antioxidants, binders, dyes, emulsifiers or flavoring substances.

Figure 1:
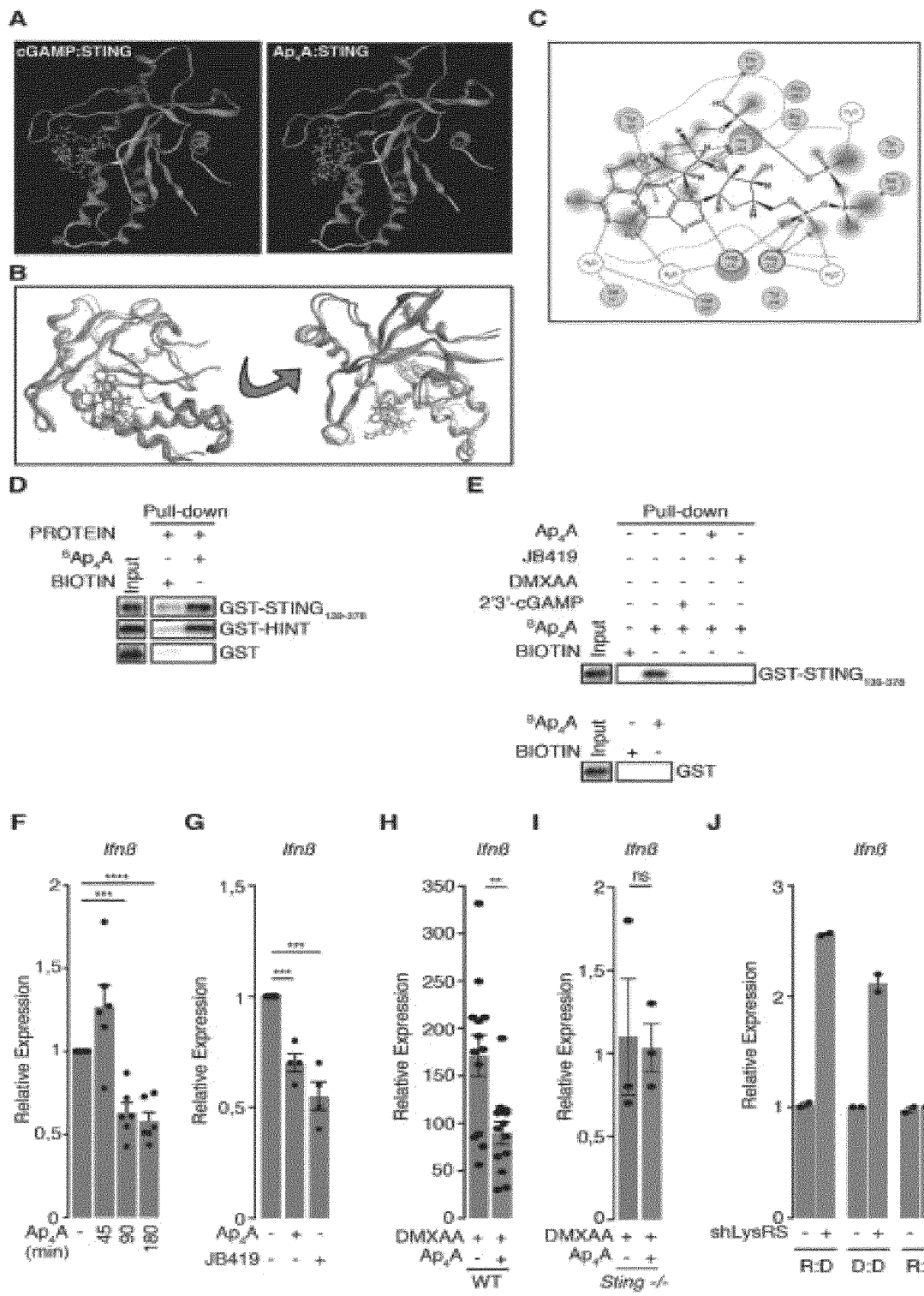

The present invention is illustrated by the following figures:

FIG. 1. Diadenosine tetraphosphate (Ap4A) interacts with STING to prevent its activation.

(A) The 3D modeling of docked cGAMP (left) or Ap4A (right) in the cleft of STING obtained using Amber force field and the crystal structure of human STING complexed to cGAMP (PDB: 4KSY). Ap4A has adopted a horseshoe like conformation.

(B) Superposition of the 3D structures obtained as in A of cGAMP and Ap4A compounds in the proximity of the active site of STING. Ap4A is in blue and green, cGAMP is in red and pink.

(C) Predicted molecular interactions that stabilize Ap4A in the active site of STING. Atoms are pink spheres (acidic: red outline; basic: blue outline). Interactions are depicted by arrows showing the direction of the electron exchange (donor or acceptor), with in blue backbone interactions and in green sidechain interactions. The dotted contour defines the proximity of the available conformational space for the depicted compound.

(D) Western blotting of in vitro binding experiment using GST, GST-HINT or GST-STING$_{139-378}$ and Streptavidin-immobilized biotinylated Ap4A. Representative experiment.

(E) Western blotting of in vitro binding experiment using GST or GST-STING$_{139-378}$ and Streptavidin-immobilized biotinylated Ap4A. Competition was performed with cGAMP, DMXAA, STAN-1 (indicated as "JB-419") or Ap4A as indicated. Representative experiment.

(F) Mean relative Ifnβ levels in Ap4A-treated versus untreated mouse embryonic fibroblasts knockout for Trex1 (MEF$^{Trex1-/-}$) for 45 min, 90 min or 180 min (n=6). One sample column t-test. ****: p<0.0005.

(G) Mean relative Ifnβ levels in MEF$^{Trex1-/-}$ treated with Ap4A or STAN-1 for 3 h versus untreated MEF$^{Trex1-/-}$ (n=4). One sample column t-test. ****: p<0.0005.

(H) Mean relative Ifnβ levels in WT-MEF stimulated with 200 μM DMXAA and treated, or not, with Ap4A for 2 h (n=13). Data are normalized to non-treated control. Unpaired t-test. **: p<0.005.

(I) Mean relative Ifnβ levels in MEF$^{Sting-/-}$ stimulated with 200 μM DMXAA and treated, or not, with Ap4A for 2 h (n=3). Data are normalized to non-treated control.

(J) Relative Ifnβ levels in shLuc versus shLysRS-treated MEF$^{Trex1-/-}$ after transfection with RNA:DNA hybrids, dsDNA or dsRNA. Results are presented as mean Ifni levels (n=4).

Figure 2:
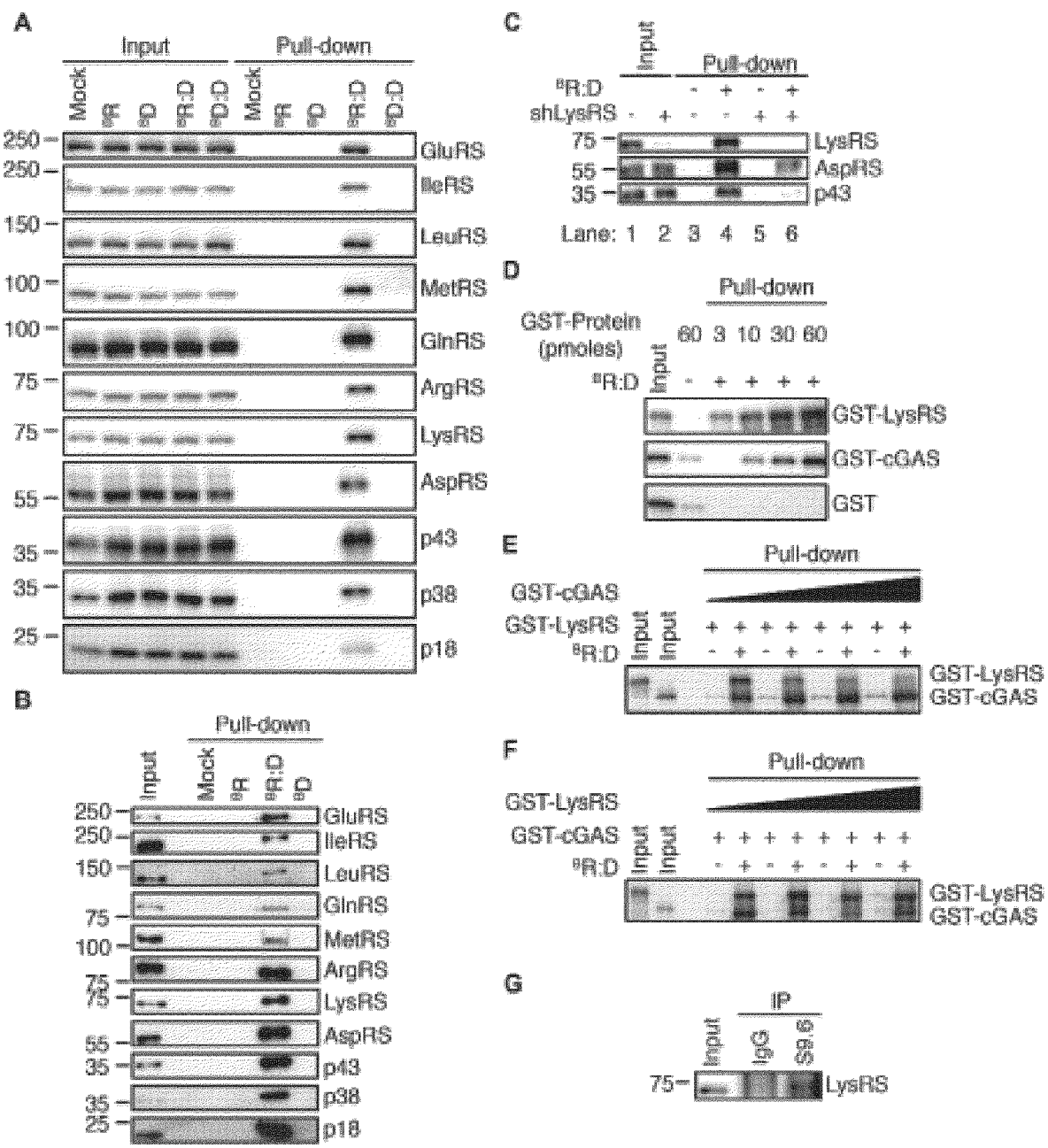

FIG. 2. LysRS directly interacts with RNA:DNA hybrids in cells.

(A) HeLa cells were transfected with ssRNA ($^B$R), ssDNA ($^B$D), dsDNA ($^B$D:D) or RNA:DNA ($^B$R:D) with a 5' biotin on their sense strands for 6 h prior to whole cell extraction and pull-down on Streptavidin affinity beads. Western blots were performed using the indicated antibodies.

(B) As in A, except that cytosolic extracts from HeLa-S3 cells were used for pull-down using ssRNA ($^B$R), RNA:DNA ($^B$R:D), or ssDNA ($^B$D).

(C) As in A, except that whole-cell extracts from A549 cells stably expressing shLuc or shLysRS were used in pull-downs using $^B$R:D. Representative experiment (n=4).

(D) In vitro interaction assay. Three, 10, 30 and 60 pmols of recombinant proteins were incubated with 20 pmols of $^B$R:D prior to pull-down using Streptavidin affinity beads. Input and eluates were immunoblotted with anti-GST antibody.

(E-F) Competition experiments. Streptavidin immobilized $^B$R:D were incubated with 10 pmols of LysRS and increasing doses of cGAS (E) or with 10 pmols of cGAS and increasing doses of LysRS (F). Input and pulled-down material were immunoblotted with anti-GST.

(G) Whole cell extract from crosslinked HeLa cells was immunoprecipitated with the S9.6 anti-DNA:RNA hybrid antibody or mock IgG. Input and immunoprecipitates were analyzed by Western Blot.

FIG. 3. Lysyl tRNA synthetase negatively regulates STING-dependent interferon responses.

(A) Mean (±SEM) Ap4A levels in WT-MEFs transfected with RNA:DNA hybrids for 3, 6, 9 or 12 h are expressed relative to non-transfected cells (n=3).

(B) Left panel: Mean relative Ifnβ mRNA levels in shLysRS-expressing versus shLuc-expressing WT-MEF (Representative experiment, n=4). Right panel: Western blot on extracts from cells treated as in the left panel using indicated antibodies.

(C) Mean Ifnβ and LysRS mRNA levels in shLysRS-expressing versus shLuc-expressing MEF$^{Trex1-/-}$ transfected or not with RNA:DNA hybrids for 6 h (n=7). Unpaired t-test. *: p<0.05.

(D) Western blot on extracts from cells treated as in C. Representative immunoblot.

(E) Mean Ifnβ mRNA levels in MEF$^{Trex1-/-}$ overexpressing LysRS following transfection or not with RNA:DNA hybrids (n=4). Unpaired t-test. *: p<0.05.

(F) Western blot on extracts from cells treated as in C. Representative immunoblot.

(G-H) Mean relative Ifnβ mRNA levels in MEF$^{Trex1-/-}$ transduced with shLuc, shLysRS, shSting or shLysRS and shSting prior to transfection (H) or not with RNA:DNA hybrids (G). Data are expressed relative to shLuc-expressing cells (n=7). Unpaired t-test. **: p<0.005.

(I) Immunoblot of cell extracts from experiment performed as in G and H.

(J) Ifnβ mRNA levels in WT-MNF (Mouse Neonatal Fibroblast) and MNF$^{LysR+/-}$ (cells derived from 2 independent 1 day-old mice). Different colors indicate different mice.

(K-L) WT-MNF and MNF$^{yYSR+/-}$ were infected with Herpes simplex Virus-1 (K) or HSV-2 (L) at multiplicity of infection=1 (MOI=1) and viral titers measured 24 h later. Data represent biological triplicates of cells derived from 2 independent 1 day-old mice. Different colors indicate different mice. Unpaired t-test. *: p<0.05.

Figure 4:
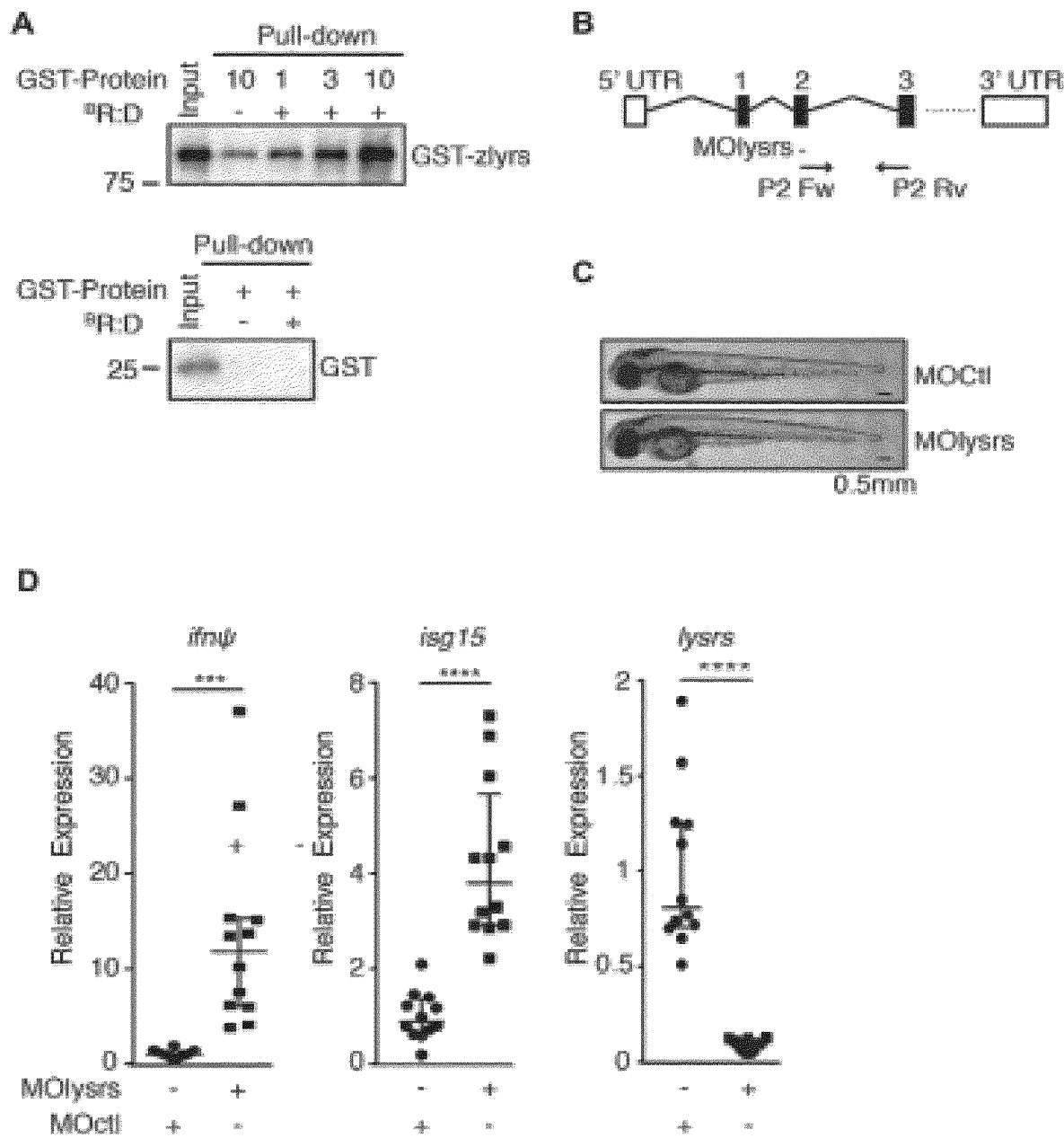

FIG. 4. LysRS negatively regulates inflammatory responses in vivo.

(A) Western blot analysis of pull-down experiments performed as in FIG. 2D, except that 1, 3 and 10 pmols of recombinant zebrafish LysRS protein were used.

(B) Schematic representation of the zebrafish lysrs locus. Regions targeted by lysrs-targeting morpholino oligo (MO-lysrs) and primers used for amplification of lysrs are indicated with red or as black arrows respectively. Boxes: exons, straight lines: introns.

(C) Larvae injected with MO-lysrs or with control MO (MO-Ctl).

(D) lysrs, ifnφ1 and isg15 levels were quantified by RT-qPCR in larvae injected with MO-lysrs or with MO-Ctl. Median (±SEM) of 12 pools of 3 independent larvae per condition. Student t-test. ****p<0.0005.

FIG. S1. Diadenosine tetraphosphate interacts with the cGAMP-binding pocket of STING.

(A) Molecular interactions that stabilize cGAMP in the active site of STING.

(B) Molecular dynamics trajectories. Black: STING, red: STING:Ap4A, blue: STING:cGAMP. All molecular systems equilibrate fast, with the STING:cGAMP system espousing the most stable complex (lowest equilibrium energy).

(C) Coomassie coloration of recombinant proteins used in FIGS. 1D and 1E.

(D) Left panel: mean relative expression levels of Ifnβ in MEF$^{Trex1-/-}$ as compared to WT-MEF. One column sample t-test. *: p<0.05 (n=4). Right panel WCE from WT-MEF and MEF$^{Trex1-/-}$ were analyzed by Western blot.

(E) Western blot analysis of whole cell extracts from cells used in FIG. 1J probed with indicated antibodies. Representative blot.

FIG. S2. LysRS is recruited to RNA:DNA hybrids in cells.

(A) Cytosolic and nuclear fractions from HeLa-S3 were analyzed by Western blot using anti-PARP1 and anti-Tubulin antibodies.

(B) Coomassie staining of recombinant proteins used in FIG. 2D.

(C) Upper panel: 3, 10 and 30 pmols of recombinant mouse LysRS protein were incubated with 20 pmols of $^B$R:D prior to pull-down on streptavidin affinity beads. Input and eluates were analyzed by Western blot with anti-GST antibody. Lower panel: 3 pmols of recombinant mouse LysRS were incubated with 20 pmols of $^B$R:D prior to pull-down on streptavidin affinity beads. Where indicated, nucleic acids were treated with RNaseH prior to pull-down. Input and eluates were analyzed by Western blot.

(D) Nucleic acids extracted from HeLa cells were treated with 10, 20 or 40 Units of RNaseH prior to radiolabeling with γP32, migration on non-denaturing acrylamide gel and autoradiography.

FIG. S3. Lysyl tRNA synthetase negatively regulates STING-dependent interferon responses.

(A) Ifnβ mRNA levels of WT-MEF transfected with RNA:DNA hybrids over a time course prior to harvesting for Ap4A quantification (FIG. 3A). Representative experiment (n=3).

(B) Whole cell extracts of cells treated as in A. Representative Immunoblot.

(C) MEF$^{Trex1-/-}$ were transduced with LysRS targeting shRNA for 72 h prior to transfection or not with RNA:DNA hybrids. Ifni and LysRS mRNA levels were analyzed by RT-qPCR and expressed as mean relative expression (±SEM) as compared to cells transduced with a Luciferase targeting shRNA. Representative experiment (n=3).

(D) Whole cell extracts of WT-MNFs or MNF$^{LysRS+/-}$ were analyzed by Western blot with the indicated antibodies.

FIG. S4. Tests of different compounds of formula (I) for inhibition of IFNα and IFNβ Treatment with Ap4A decreases type I interferon expression. Mouse Embryonic Fibroblasts knock out for the trex1 exonuclease (MEF$^{Trex1-/-}$) were treated with 500 μM of Ap4A or analogues (STAN-1, 4, 5, 12, 8, 9 and 10) for 3 hrs prior to RNA extraction and RT-qPCR analysis of indicated mRNA levels. Graph presents mean relative mRNA levels in an experiment performed in triplicate.

FIG. S5. Metabolic activity of wild type mouse embryonic fibroblasts (MEF) and MEF knock out for Trex1.

Metabolic activity of wild type mouse embryonic fibroblasts (MEF-WT, panel A) and MEF knock out for Trex1 (MEF-TREX, panel B) following treatment with JB-419 (Analogue of Ap4A-STAN1).

FIG. S6. Dose response in MEF-TREX cells.

The inventors treated the cells for 24 h with the JB-419 compound (STAN-1) prior to RT-qPCR analysis of Ifnb expression and of interferon response genes (Ifit2 and Cxcl10).

EXAMPLE 1: LYSYL-TRNA SYNTHETASE PRODUCES DIADENOSINE TETRAPHOSPHATE (AP4A) TO CURB STING-DEPENDENT INFLAMMATION

Materials and Methods

Cells and Cell Cultures

293T, A549, HeLa, HeLa-S3, WT-MEF, MEF$^{Tmem173-/-}$, MEF$^{cGas-/-}$ and MEF$^{Trex1-/-}$ were maintained in DMEM supplemented with 10% Fetal Bovine Serum (FBS), 1% Penicillin/Streptomycin and 1% Glutamine. A549 were obtained from S. Goodborn. WT-MEF, MEF$^{Sting-/-}$, MEF$^{cGas-/-}$ were a gift of SR Paludan, MEF MP and MEF$^{Trex1-/-}$ were obtained from J. Rehwinkel.

Mouse Neonatal Fibroblasts

Mouse Neonatal Fibroblasts were purified as described by the Krishma Halai laboratory. Briefly, newborns at day one were sacrificed, the head was cut off and the skin isolated and all fat removed.

Skin was incubated in KRH/ATB (Krebs-Ringer buffer containing 10 mM Hepes and 1% Penicillin/Streptomycin) and minced in pieces with a scalpel prior to digestion in KRH/ATB buffer supplemented with 1 mg/ml of collagenase at 37° C. After centrifugation at 1,000 rpm for 5 minutes the supernatant was discarded and the isolated cells put in culture in DMEM, 20% FBS and 1% Penicillin/Streptomycin. Cells were left to rest for 3 days before changing media.

Plasmids shRNAs targeting LysRS and STING were cloned into the pSUPERIOR.retro.puro vector from Oligoengine, according to the manufacturer's instructions. N-terminally Flag- and HA-tagged codon-optimized mouse LysRS (MWG Eurofins) was cloned into the pOZ retroviral vector. For bacterial expression of recombinant proteins, the human LysRS gene was amplified by PCR from cDNA of HeLa cells. The cDNA and codon-optimized human cGAS (MWG Eurofins) were cloned into the pGEX-4T1 plasmid. Codon-optimized mouse LysRS was cloned into the pGEX-4T1 plasmid. Danio Rerio LysRS (zLysRS) was amplified by PCR from the cDNA of Zebra Fish larvae and cloned in pGEX-4T1.

Viral Particle Production and Infection shRNA-expressing retroviral particles were produced by co-transfection of 2×10$^6$ 293 T cells with 5 μg shRNA-containing pSUPERIOR, 2.5 μg of MLV GagPol and 2.5 μg of A-MLV envelope, using the standard calcium phosphate transfection protocol. Retroviral particles containing the transgene encoding Flag-HA-tagged LysRS (F/HA-LysRS) were produced following the same procedure except that cells were co-transfected with 5 μg pOZ-F/HALysRS, 2.5 μg of MLV GagPol and 2.5 μg of A-MLV envelope. Viral particles were harvested 48 h post-transfection, filtered with 0.45 μM filters and used for transduction. For knock-down of LysRS, 10$^5$ cells were seeded 24 h before transduction. Media was replaced 10 h post-transduction and transfection was performed 72 h later. A similar procedure was used for knock-down of LysRS and STING, except that retroviral particles containing shRNAs targeting LysRS and STING were added at the same time. For expression of F/HA-LysRS, 5×10$^5$ cells were seeded 24 h before transduction. Twenty-four hours later, viral particles were added and media replaced after 10 h. RNA:DNA hybrids were transfected 96 h later.

HSV Plaque Assay

MNFs were seed at a density of 0.5$^{-1}$×10$^5$ cells per well in a 24-well plate (Nunc) in 500 μl DMEM+1% FCS 24 h prior to infection with HSV-1 KOS or HSV2 333 at MOI 0.1. Supernatants were harvested 24 h later and the virus yield was quantified using the plaque titration assay on Vero cells.

Protein Purification

Recombinant GST-HINT, GST-LysRS, GST-cGAS, GST-STING (aa 139-378), and GST-ZfLysRS were produced in Escherichia coli BL21 cells. E. coli transformed with GST or GST expression constructs were grown in LB medium at 37° C. to an A600 of 0.6 prior to induction with 0.25 mM isopropyl-β-D-1-thiogalactopytanoside (IPTG) overnight at 16° C. Bacteria were harvested by centrifugation, resuspended in lysis TETN-100 buffer (50 mM Tris-HCl pH 8, 100 mM NaCl, 1 mM EDTA, 0.1% Triton X-100, supplemented with 2 mg/mL lysozyme (Sigma), 10 mM β-mercaptoethanol and 0.5 mM PMSF) and incubated on ice for 30 min. Salt and detergent concentrations were increased respectively to 400 mM and 0.5% previous to sonication.

Lysates were resuspended in TETN-400 buffer (50 mM Tris-HCl pH 8, 400 mM NaCl, 1 mM EDTA, 0.5% Triton X-100, supplemented with 10 mM 6-mercaptoethanol and 0.5 mM PMSF) and were clarified by centrifugation at 13,000 rpm for 30 min at 4° C. prior to incubation with the appropriate volume of glutathione-Sepharose beads for 4 h at 4° C. Sepharose beads were washed three times with ice-cold TETN-400 buffer and recombinant proteins were eluted with elution buffer (150 mM NaCl, 50 mM Tris-HCl pH 8) supplemented with 30 mM reduced L-glutathione. Eluates were quantified by Coomassie staining.

Biotinylated Nucleic Acid Pull-Down Using Recombinant Protein

In vitro interaction between RNA:DNA hybrids and recombinant proteins was performed using Dynabeads M280. Beads were blocked overnight in blocking buffer (20 mM HEPES pH 7.9, 15% glycerol, 0.05% NP-40 and 50 mM NaCl, supplemented with 2 mM DTT, 100 mM NaCl and 10 mg/mL BSA). After 3 washes in 1× wash buffer (5 mM Tris-HCl pH 7.5, 1 mM EDTA and 1 M NaCl), nucleic acid coupling to M280 beads was performed according to manufacturer's instructions. Briefly, beads were resuspended in 30 µL of 2× wash buffer (10 mM Tris-HCl pH 7.5, 2 mM EDTA, 2 M NaCl) and twenty pmoles of $^B$RNA:DNA hybrids were bound to the beads at 25° C. for 15 min. Protein binding was performed at 37° C. for 30 min with increasing amounts of recombinant proteins in 20 mM HEPES pH 7.9, 15% glycerol, 0.05% NP-40 and 150 mM NaCl, supplemented with 2 mM DTT, 2 mM PMSF and RNase inhibitor. When indicated, hybrids were treated with 30 U of RNaseH (Ambion) in RNaseH buffer (50 mM Tris-HCl pH8, 50 ng/mL BSA, 1 mM DTT and 4 mM MgCl2) for 1 h at 30° C., prior to binding to the beads. After 3 washes, bound material was eluted in 30 µL of Laemmli buffer. Pull down in competition between hcGAS and hLysRS was performed as described above except that the two proteins were added at the same time to the beads coupled to the $^B$RNA:DNA.

Biotinylated Nucleic Acid Pull-Down from Cell Extracts

Interaction of endogenous protein and transfected biotinylated nucleic acids was tested by transfecting target cells with 2 µg/mL of nucleic acids using JetPrime according to the manufacturer's protocol. Six hours post transfection cells were harvested and lysed in TENTG-150 (20 mM Tris-HCl pH 7.4, 0.5 mM EDTA, 150 mM NaCl, 10 mM KCl, 0.5% Triton, 1.5 mM MgCl2, 10% glycerol, supplemented with 10 mM β-mercaptoethanol and 0.5 mM PMSF) on ice for 30 min. Lysates were centrifuged at 13,000 rpm for 30 min at 4° C. Equal amounts of total cell lysates were incubated 3 h at 4° C. on a wheel with 3 µg (30 µl) Dynabeads M280 blocked overnight at 4° C. as described above. After 3 washes in 20 mM Tris-HCl pH 7.4, 0.5 mM EDTA, 0.05% Triton, 0.1% Tween, 150 mM NaCl, 10% glycerol, 5 mM MgCl2, bound material was eluted in Laemmli buffer.

In Vitro Biotinylated Nucleic Acid Pull-Down

Pull-down was carried out using 3 µg (30 µL) of Dynabeads M280 per condition. Beads were blocked overnight as described above. After 3 washes in 1× wash buffer, nucleic acid were coupled to M280 beads according to the manufacturer's instructions. Briefly, beads were resuspended in 30 µL of 2× wash buffer and 3 µg of $^B$RNA:DNA, 100 pmoles of ss$^B$RNA, 100 pmoles of ss$^B$DNA or water were added to the mix and incubated at 25° C. for 15 min. Beads were washed twice in 1× wash buffer and equilibrated in dialysis buffer (20 mM Tris-HCl pH 7.4, 0.5 mM EDTA, 150 mM NaCl, 10% glycerol, 1.5 mM MgCl2). S100 was diluted in dialysis buffer supplement with 2% Tween, 1% Triton, 10 mM β-mercaptoethanol, 0.5 mM PMSF and centrifuged at 13,000 rpm for 30 min at 4° C. One mL of diluted lysate was added to the beads and incubated at 4° C. on a rocker for 4 h in low-binding tubes (Axygen). Three consecutive washes were performed in 20 mM Tris-HCl pH 7.4, 0.5 mM EDTA, 0.05% Triton, 0.1% Tween, 150 mM NaCl, 10% glycerol, 5 mM MgCl2. Tubes were changed at first and last wash. Bound material was eluted in 30 µL was eluted in Laemmli buffer.

Pull-Down Using Biotinylated Ap4A and Recombinant Proteins

In vitro interaction between STING and Ap4A was tested with Dynabeads M280, blocked as described above. Ten micromolar of biotinylated Ap4A (BioLog) or Biotin were bound to the beads at 25° C. for 30 min in 2× wash buffer. Thirty, 50 or 100 µg of recombinant proteins (mSTING, mHINT and GST) were incubated with the beads for 1 hour at 4° C. on the wheel in a final volume of (50 mM Tris-HCl pH8, 50 ng/mL BSA, 1 mM DTT and 4 mM MgCl2) in 150 mM NaCl, 50 mM Tris-HCl pH 8.0, 10 mM MgCl2, 0.1 µg/µl BSA, 10 mM 6-mercaptoethanol and 0.5 mM PMSF. Competition was performed after protein binding using a 10-fold excess of the competitor (DMXAA, 2'3'-cGAMP, Ap4A or STAN-1) for 1 h at 4° C. on the wheel in a final volume of 200 µl in the same buffer described above. After 3 washes in 150 mM NaCl, 50 mM Tris-HCl pH 8.0, 10 mM MgCl2, 0.1% Tween, 0.1 µg/µl BSA, 10 mM β-mercaptoethanol and 0.5 mM PMSF, bound material was eluted in 30 µL Laemmli buffer.

S9.6 Immunoprecipitation

Endogenous RNA:DNA hybrids were immunoprecipitated using the S9.6 antibody. Briefly, HeLa cells were crosslinked with 1% PFA for 20 min at room temperature. PFA was quenched by incubation with 125 mM glycine for 5 min at room temperature. Cells were harvested and lysed in TENTG-150 on ice for 30 min. Lysates were centrifuged at 13,000 rpm at 4° C. for 30 min. The soluble fraction was pre-cleared for 20 min at 4° C. with 15 µl of agarose protein G beads, followed by incubation overnight at 4° C. with 30 µl agarose protein-G beads coupled to 10 µg/ml of either irrelevant mouse IgG or S9.6 antibody. Beads were washed 5 times in TENTG-150 buffer and immunoprecipitated material was eluted in Laemmli buffer.

RNA extraction and RT-qPCR RNA was extracted using Trizol (Invitrogen) and treated with TURBO DNase (Ambion) according to manufacturers' protocols. Reverse transcription (SuperScript IV reverse transcriptase; Invitrogen) and qPCR using specific primers were performed using SYBR GREEN (Takara) master mix and LightCycler 480 cycler (Roche). mRNA levels were normalized to Gapdh mRNA levels except in zebrafish experiments where mRNA levels were normalized to zebrafish actin (zactin).

Whole Cell Extract Preparation and Immunoblot

Cells were either lysed in 3 packed cell volume (PCV) of RIPA buffer (150 mM NaCl, 50 mM Tris-HCl pH8, 0.5% sodium deoxycholate, 0.1% SDS and 1% NP-40) supplemented with 0.5 mM PMSF for 15 min at 4° C., or 5 PCV of TENTG-150 for 30 min at 4° C. Lysates were centrifuged 30 min at 13,000 rpm. For phosphorylated proteins analysis, buffer was supplemented with PhosphoSTOP (Roche) prior to whole cell extraction. Protein quantification was performed using Bradford assay. Samples were resolved on SDS-PAGE and proteins transferred onto nitrocellulose membranes. Primary antibodies used include: anti-phospho IRF3 (1:500; Cell Signaling 4D4G), anti-IRF3 (1:1000; Cell Signaling D614C), anti-phospho TBK1 (1:1000; Cell Signaling D52C2), anti-TBK1 (1:1000; Cell Signaling D1B4), anti-STING (1:1000; Cell Signaling D2P2F), anti-HA (1:10000; Roche), anti-GAPDH (1:5000; Proteintech Europe 800004-1-Ig), anti-AMP1 (1:1000; Bethyl laboratories A304896A-M), anti-DARS (1:1000; Bethyl laboratories A304799A-M), anti-human LysRS (1:1000; Bethyl laboratories A300630A-M), anti-mouse LysRS (1:2000; Proteintech Europe 14951-1AP) and anti-GST (1:10000; Bethyl laboratories A190122A), anti PARP-1 (1:500; Santa Cruz F-2 sc8007), anti-Tubulin (1:2000; Proteintech Europe 66031-1-Ig), anti-TREX-1 (1:250; Santa Cruz C-11 sc133112), anti-cGAS mouse specific (1:1000; Cell Signaling D3080). The S9.6 antibody was a gift from Stephen Leppla. All secondary antibodies (Cell Signaling) were used at 1:2000 dilution. Signal was visualized with SuperSignal West Pico Chemiluminescent Substrate (ThermoFisher Scientific) and images acquired on a chemidoc (Biorad).

Morpholino Knock-Down Experiments

Eggs of wild type AB zebrafish (one cell stage) were microinjected with 4 ng of the KARS specific antisense morpholino (MO3i3, 5' TCCATATTCGCTACTCATCGTACAT 3'; SEQ ID NO:1) or with a control morpholino (MOctl, TACCAAAAGCTCTCTTATCGAGGGA; SEQ ID NO:2). The KARS-specific MO targets the splice donor site between exon 3 and intron 4. Efficiency of knockdown was assessed by RT-qPCR with splice-sensitive primers (Fw: TGGACCCCAATCAATACTTCAAG; SEQ ID NO:3;
Rev: GGTCTCCAGGCTGAAGGTGGTTAT; SEQ ID NO:4). Embryos then developed with no obvious morphological defects at 28° C. At 72 h pf, embryos were collected for gene expression analysis by RT-qPCR.

Molecular Modelling

Molecular Docking of Ap4A on STING was performed using ZDOCK, version 3.0 using the STING crystal structure (PDB id: 4KSY). RDOCK was utilized to refine and quickly evaluate the results obtained by ZDOCK. Energy minimization was performed to remove the geometrical strain from the top-ranking poses of Ap4A during the docking experiments. Top hit complexes of Ap4A and STING were subjected to extensive energy minimization run using the Amber99 forcefield as it is implemented into Gromacs, version 4.5.5, via the Gromita graphical interface, version 1.07. An implicit Generalized Born (GB) solvation was chosen at this stage, in an attempt to speed up the energy minimization process. The interaction space and binding potential of each docking conformation, were further explored by subjecting the molecular complexes to unrestrained molecular dynamics simulations using the Gromacs suite, version 4.5.5. Molecular dynamics took place in a periodic environment, which was subsequently solvated with SPC water using the truncated octahedron box extending to 7 Å from each molecule. Partial charges were applied and the molecular systems were neutralized with counterions as required. The temperature was set to 300 K and the step size was set to 2 femtoseconds. The total run of each molecular complex was 100 nanoseconds, using the NVT ensemble in a canonical environment. NVT stands for Number of atoms, Volume and Temperature that remain constant throughout the calculation. The results of the molecular dynamics simulations were collected into a molecular trajectory database for further analysis.

Determination of Intracellular Ap4A Levels in MEF

Cellular nucleotide extraction and Ap4A determination were performed using a sensitive luminescence based assay. Briefly, nucleotides were extracted from cells by adding 5 mL ice-cold trichloroacetic acid and subsequent neutralization with an equal volume of 0.6 M tri-octylamine in 1,1, 2-trichlorotrifluoroethane. Following centrifugation at 500×g for 5 min, the top aqueous layer was removed, and 10 U of thermo-sensitive alkaline phosphatase (ThermoFisher) was added to degrade ATP. Remaining nucleotides were concentrated using DEAE-Sephacel beads. Following mixing and centrifugation at 12,000×g for 1 min, beads were washed with water. Nucleotides bound to DEAE-Sephacel were eluted twice with 1 M triethylammonium bicarbonate (pH 8.5) and eluates vacuum dried. Nucleotides from the 2 eluates were combined and dissolved in 120 μL Ap4A assay buffer (25 mM HEPES-NaOH, pH 7.8 and 5 mM magnesium acetate). To remove any remaining ATP, a further 10 U of alkaline phosphatase was added, incubated at 37° C., and subsequently incubated at 95° C. to denature alkaline phosphatase. Ap4A levels in 10 μl of sample was determined by adding 50 μl of Bactitre GLO (Promega). Background ATP levels were first measured on a Berthold Lumat 9507 and once stabilized, recombinant Ap4A hydrolase was added to cleave Ap4A (ATP+ AMP), and levels of ATP measured by the increase in luminescence.

Levels of Ap4A in samples were determined by comparison to standards and expressed as picomoles per $10^6$ cells.

Radiolabeling

For radiolabeling experiments, HeLa cells were lysed in TENTG-150 buffer and DNA extracted with Phenol/Chloroform/Isoamyl pH 8 (12/12/1). DNA was subsequently dephosphorylated using rSAP (NEB) prior to labeling with γ32P ATP for 30 min at 37° C. using the T4 Polynucleotide kinase (NEB). Subsequent RNaseH treatment was performed with 10 U, 20 U or 40 U following the manufacturer's protocol. Unbound radiolabeled nucleotides were removed using Illustra Microspin G-50 Columns prior to resolution on 5% acrylamide, 0.5% Tris Borate Ethylamide gel and autoradiography. Images were acquired using Thyphon FLA 7000.

Cells Treatment and Transfection

Cells were transfected with JetPrime transfection reagent (Polyplus) at 1:2 ratio with various nucleic acids at 2 μg/ml. DMXAA (Invivogen) was used at 200 μM in Optimem (Gibco). Ap4A or STAN-1 (Sigma Aldrich) were used at 500 μM in Optimem.

Compounds (PubChem CID)

DMXAA (Vadimezan): 123964

Ap4A (Diadenosine tetraphosphate): 21706

Oligonucleotides Sequences

| mIFNβ fw | 5' CTGCGTTCCTGCTGTGCT TCTCCA 3' (SEQ ID NO: 5) |
| mIFNβ rv | 5' TTCTCCGTCATCTCCATA GGGATC 3' (SEQ ID NO: 6) |
| mIL-6 fw | 5' GACTTCCATCCAGTTGCCTTCT 3' (SEQ ID NO: 7) |
| mIL-6 rv | 5' TCCTCTCCGGACTTGTGAAGTA 3' (SEQ ID NO: 8) |
| mIL-8 fw | 5' CATCTTCGTCCGTCCCTGTG 3' (SEQ ID NO: 9) |

| | | |
|---|---|---|
| mIL-8 rv | 5' CCTTCACCCATGGAGCATCA 3' | (SEQ ID NO: 10) |
| mIFNα fw | 5' GCTTTACTGATGGTCCTGGTGGTG 3' | (SEQ ID NO: 11) |
| mIFNα rv | 5' AATCCAAAATCCTTCCTGTCCTTC 3' | (SEQ ID NO: 12) |
| mSTING fw | 5' TTGGGTACTTGGGGTTGATCTT 3' | (SEQ ID NO: 13) |
| mSTING rv | 5' GCACCACTGAGCATGTT GTTATG 3' | (SEQ ID NO: 14) |
| mLysRS fw | 5' GTACTGCCCTGGAATAC GGG3' | (SEQ ID NO: 15) |
| mLysRS rv | 5' TTTCAGTGGTCGCTGCAG TT3' | (SEQ ID NO: 16) |
| mGAPDH fw | 5' TTCACCACCATGGAGAAGGC 3' | (SEQ ID NO: 17) |
| mGAPDH rv | 5' GGCATCGACTGTGGTCATGA 3' | (SEQ ID NO: 18) |
| zfACTIN fw | 5' CGAGCTGTCTTCCCATCCA 3' | (SEQ ID NO: 19) |
| zfACTIN rv | 5' TCACCAACGTAGCTGTCTTTCTG 3' | (SEQ ID NO: 20) |
| zfIFNφ fw | 5' GAATGGCTTGGCCGATACAGGATA 3' | (SEQ ID NO: 21) |
| zfIFNφ rv | 5' TCCTCCACCTTTGACTTGTCCATC 3' | (SEQ ID NO: 22) |
| zfLysRS fw P2 | 5' TGGACCCCAATCAATACTTCAAG 3' | (SEQ ID NO: 23) |
| zfLysRS rv P2 | 5' GGTCTCCAGGCTGAAGGTGGTTAT 3' | (SEQ ID NO: 24) |

Oligonucleotides Sequences for Annealing

RNA 2 or $^B$RNA 2 were annealed with RNA 5 to generate non biotinylated or biotinylated dsRNA; RNA 2 or $^B$RNA 2 were annealed with DNA 9 to generate non-biotinylated or biotinylated RNA:DNA hybrids; DNA 9 or $^B$DNA 9 were annealed with DNA 6 to obtain non-biotinylated or biotinylated dsDNA. Annealing was performed in a MasterCycler nexus gradient (Eppendorf) in annealing buffer (60 mM NaCl, 5 mM Tris-HCL pH 7.5 and 0.2 mM EDTA) using the following program: 4 min at 95° C., 85° C., 82° C., 80° C., 78° C., 75° C., and 72° C., followed by 10 min at 70° C. and slow cooling down to 10° C. over a period of 2 h. The quality of annealed material was controlled by running 500 ng of annealed material on a 10% non-denaturing acrylamide gel using ssRNA and ssDNA as controls.

RNA 2:
(SEQ ID NO: 25)
UUU CAA UUC CUU UUA GGA UUA AUC UUG AAG AUA GAG UUA A

RNA 5:
(SEQ ID NO: 26)
UUA ACU CUA UCU UCA AGA UUA AUC CUA AAA GGA AUU GAA A

DNA 9:
(SEQ ID NO: 27)
TTA ACT CTA TCT TCA AGA TTA ATC CTA AAA GGA ATT GAA A

DNA 6:
(SEQ ID NO: 28)
TTT CAA TTC CTT TTA GGA TTA ATC TTG AAG ATA GAG TTA A $^B$RNA 2:
(SEQ ID NO: 29)
BIO-UUU CAA UUC CUU UUA GGA UUA AUC UUG AAG AUA GAG UUA A $^B$DNA 9:
(SEQ ID NO: 30)
BIO-TTA ACT CTA TCT TCA AGA TTA ATC CTA AAA GGA ATT GAA A shRNA Sequences shSTING fw (mouse)
(SEQ ID NO: 31)
5' GATCCCCTGATTCTACTATCGTCTTATTCAAGAGATAAGACGATAGTAGAATCATTTTTC 3' shSTING rv (mouse)
(SEQ ID NO: 32)
5' TCGAGAAAAATGATTCTACTATCGTCTTATCTCTTGAATAAGACGATAGTAGAATCAGGG 3' shLysRS fw (mouse) 1
(SEQ ID NO: 33)
5' GATCCCCGAATCAGCATGGTAGAAGATTCAAGAGATCTTCTACCATGCTGATTCTTTTTC 3' shLysRS rv (mouse) 1
(SEQ ID NO: 34)
5' TCGAGAAAAAGAATCAGCATGGTAGAAGATCTCTTGAATCTTCTACCATGCTGATTCGGG 3' shLysRS fw (mouse) 2
(SEQ ID NO: 35)
5' GATCCCCGAAATTTATCGTCCGCTCTTTCAAGAGAAGAGCGGACGATAAATTTCTTTTTC 3'

-continued shLysRS rv (mouse) 2
(SEQ ID NO: 36)
5' TCGAGAAAAAGAAATTTATCGTCCGCTCTTCTCTTGAAAGAGCGGAC

GATAAATTTCGGG 3' shLysRS fw (mouse) 3
(SEQ ID NO: 37)
5' GATCCCCGCCTTTCATCACCTATCACTTCAAGAGAGTGATAGGTGAT

GAAAGGCTTTTC 3' shLysRS rv (mouse) 3
(SEQ ID NO: 38)
5' TCGAGAAAAAGCCTTTCATCACCTATCACTCTCTTGAAGTGATAGGT

GATGAAAGGCGGG 3' shLysRS fw (human)
(SEQ ID NO: 39)
5' GATCCCCCAAGGTATCGCCAGAGATATTCAAGAGATATCTCTGGCGA

TACCTTGTTTTC 3' shLysRS rv (human)
(SEQ ID NO: 40)
5' TCGAGAAAAACAAGGTATCGCCAGAGATATCTCTTGAATATCTCTGG

CGATACCTTGGGG 3'

Results

The inventors first assessed whether the reported regulatory effect of Ap4A on immune responses (9-11) relies on a STING-dependent mechanism. To this aim, they used AMBER force field (12) and the previously published co-crystal of STING with cGAMP (PDB: 4KSY) to compare the binding of Ap4A and cGAMP to STING. This predicted that cGAMP and Ap4A adopt a similar 3D conformation upon docking to STING (FIG. 1A-B). Comparison of the interactions established between the in silico-docked Ap4A to STING (FIG. 1C) to those in the crystal structure of STING and cGAMP (FIG. S1A) indicate that similar interactions are established. Interestingly, comparison of the potential energies indicates that the Ap4A:STING complex is more dynamic than the cGAMP:STING complex and that the interaction of Ap4A to STING is thermodynamically less stable (see Tables 1 and 2 below).

TABLE 1

STING:Ap4A energies calculation

| AP$_4$A | Energy | Strain | VDW | Electrostatic |
|---|---|---|---|---|
| ALL | −2217.16 | 371.379 | 888.739 | −4460.82 |
| INT | −270.969 | N/A | −3.908 | −267.062 |

ALL: STING:Ap4A complex energy;
INT: interaction energy;
VDW: Van Der Waals.
Calculated energies are expressed in kcal · mol$^{-1}$.

TABLE 2

STING:cGAMP energies calculation

| 2'-3'-cGAMP | Energy | Strain | VDW | Electrostatic |
|---|---|---|---|---|
| ALL | −2734.97 | 388.777 | 1831.373 | −6757.68 |
| INT | −132.188 | N/A | −10.376 | −121.811 |

ALL: STING:cGAMP complex energy;
INT: interaction energy;
VDW: Van Der Waals.
Calculated energies are expressed in kcal · mol$^{-1}$.

This was confirmed by molecular dynamics simulations showing that the Ap4A:STING complex is highly unstable compared to STING:cGAMP (FIG. 51B).

Based on these predictions, the inventors performed in vitro binding assays using recombinant GST-tagged C-terminal binding domain of mouse STING (GST-STING139-378—FIG. S1C) and Streptavidin-immobilized biotinylated Ap4A. GST and GST-tagged mouse HINT (FIG. S1C), reported to bind Ap4A (13), were included as negative and positive controls respectively. The inventors observed that, as predicted in silico, STING$_{139-378}$ interacts with Ap4A (FIG. 1D). They next performed competition experiments using an excess of unlabeled Ap4A, cGAMP or of its analogue DMXAA. This showed that the observed interaction of STING with Ap4A is specific and displaced by both cGAMP and DMXAA (FIG. 1E). Interestingly, the compound STAN-1, which is a non-hydrolysable analogue of Ap4A that was previously reported to fulfill functions of Ap4A that are unrelated to immune regulation (14), also competed for the binding of STING to Ap4A (FIG. 1E). Altogether, this confirms the in silico predictions that Ap4A and cGAMP have the same binding pocket on STING and further suggest that STAN-1 may also act on STING.

Next, to test whether Ap4A inhibits inflammatory responses via a STING-dependent mechanism, the inventors used three-prime repair exonuclease 1 (Trex1)-deficient mouse embryonic fibroblasts (MEF$^{Trex1-/-}$—FIG. S1D), as these are a well-characterized model of pathologic chronic inflammation with STING-dependent elevated Ifnβ levels (FIG. S1D)—(15, 16). First, the inventors treated MEF$^{Trex1-/-}$ with Ap4A for 45, 90 and 180 min. They observed that Ap4A decreased Ifni mRNA levels over the three-hour time-course (FIG. 1F). In agreement with the competition experiments (FIG. 1E), they also observed that treatment of MEF$^{Trex1-/-}$ with STAN-1 leads to decreased Ifni levels (FIG. 1G). In addition, simultaneously treating WT and STING knockout MEFs (MEF$^{STING-/-}$) with DMXAA and Ap4A showed that, while co-treatment reduced the ability of DMXAA to induce Ifni expression in WT-MEF by half (FIG. 1H), no decrease was observed in MEF$^{STING-/-}$ (FIG. 1I). Altogether, these experiments suggest that Ap4A interferes with STING activation. To further assess the impact of Ap4A on STING activation and to avoid potential side effects of the addition of exogenous Ap4A to cells, the inventors next performed experiments where they modulate the expression levels of LysRS, the main producer of Ap4A (9, 10). To this aim, they first knocked-down LysRS prior to challenging cells with RNA:DNA hybrids and dsDNA which are known to trigger STING signaling, or dsRNA that do not signal through STING. Absence of LysRS led to increased Ifnβ mRNA levels in response to RNA:DNA hybrids and dsDNAs, but not in response to dsRNAs (FIG. 1J). This is supported by increased levels of the phosphorylated active form of the Interferon Regulatory Factor 3 (IRF3), which is activated downstream of STING and responsible for Ifnβ transcription (FIG. S1E). Thus, these data suggest that the LysRS-Ap4A axis negatively regulates STING activation.

LysRS is the main producer of Ap4A in response to various stimuli (9, 10) and has been documented to bind both DNA and RNA in vitro (17) and RNA:DNA hybrids in cells (18). This raises the possibility that nucleic acids stimulate LysRS-dependent Ap4A production. Therefore, the inventors first tested the interaction of LysRS with nucleic acids by transfecting dsRNA, dsDNA and RNA:DNA hybrids, with a 5' biotin on the sense strand into HeLa cells, and performing streptavidin affinity pull-down experiments. Contrary to in vitro data (17), the inventors observed that in cells, LysRS interacts only with RNA:DNA hybrids (FIG. 2A). Interestingly, other subunits of the cytosol-bound Multisynthetase Subunit Complex within which LysRS fulfills its main function (19) are also recruited specifically to RNA:DNA hybrids. This was confirmed in vitro using cytosolic extracts from HeLa-S3 cells (FIG. 2B, S2A). The inventors next investigated whether the recruitment of the multisynthetase complex to RNA:DNA hybrids is depended on LysRS. For this, they knocked-down LysRS prior to the pull-down assays. This showed that decreased levels of LysRS (FIG. 2C, compare lanes 1 and 2), are accompanied by decreased association of other tested components of the tRNA multisynthetase complex (compare lanes 4 and 6). This further suggested that LysRS binds RNA:DNA hybrids directly. The inventors tested this hypothesis in vitro, using immobilized biotinylated RNA:DNA hybrids and recombinant GST-tagged human and murine LysRS, and GST-cGAS or GST as positive or negative controls, respectively (FIG. S2B). Western analysis with anti-GST antibody revealed that LysRS binds RNA:DNA hybrids directly (FIGS. 2D and S2C) and that RNase H treatment abolishes this interaction (FIG. S2C). A possible mechanism of action of LysRS could be competition with cGAS for binding to RNA:DNA hybrids. The inventors thus performed competition experiments which showed that cGAS can compete for association to RNA:DNA hybrids (FIG. 2E), while LysRS cannot replace cGAS (FIG. 2F). Next, they tested whether LysRS interacts with endogenous RNA:DNA hybrids by DNA:RNA hybrid Immunoprecipitation (adapted from (20)). Using the HeLa cell line that contains RNA:DNA hybrids (FIG. S2D), they confirmed that endogenous RNA:DNA immunoprecipitated LysRS (FIG. 2G). Altogether, these experiments show that LysRS is specifically recruited to RNA:DNA hybrids in cells, establishing these as potential triggers for LysRS activation.

The inventors next interrogated whether RNA:DNA hybrids can trigger the production of Ap4A. They measured intracellular Ap4A levels in WT-MEF, following stimulation with RNA:DNA hybrids (FIGS. S3A and B). This showed that RNA:DNA hybrids induce time-dependent Ap4A upregulation (FIG. 3A). Moreover, knock-down of LysRS in WT-MEF prior to stimulation with RNA:DNA hybrids leads to earlier onset of RNA:DNA hybrid-induced Ifnβ expression (FIG. 3B, left panel) and phosphorylation of factors downstream of STING, including IRF3 and TANK Binding Kinase 1 (TBK1—FIG. 3B, right panel). This indicates that LysRS delays the activation of STING following nucleic acid stimulation. The inventors confirmed the negative impact of LysRS on Ifni expression in MEF$^{Trex1-/-}$ by knockdown (FIGS. 3C and S3C) and overexpression (FIG. 3E) of LysRS, which decreased and increased Ifnβ levels, respectively, accompanied by concomitant increase or decrease of the phosphorylated IRF3 and TBK1 (FIG. 3D, F). Importantly, they confirmed that the negative impact of LysRS on nucleic acid-dependent inflammation required STING by knocking-down both LysRS and Sting in MEF$^{Trex1-/-}$. Indeed, absence of LysRS leads to upregulated steady-state and RNA:DNA-induced Ifni expression (FIG. 3G, H) together with increased pIRF3 levels (FIG. 3I), while in the absence of STING, the impact of LysRS knock-down is lost (FIG. 3G-H). Thus, LysRS negatively controls STING activation. In further support of the role of LysRS in controlling innate immune responses, primary mouse neonatal fibroblasts heterozygous for LysRS (MNF$^{sLYsRS+/-}$— FIG. S3D) showed higher basal Ifnβ levels (FIG. 3J) than their wild-type counterparts (MNF$^{sLysRS+/+}$). Consistent with their higher levels of Ifnβ, MNF$^{sLysRS+/-}$ poorly support Herpes Simplex Virus (HSV) type 1 and 2 replication (FIG. 3K, L). Thus, LysRS negatively regulates Ifni expression in a model of STING-dependent chronic inflammation and absence of LysRS establishes an antiviral state.

Finally, the inventors wished to challenge the finding in vivo in zebrafish embryos taking advantage of the close evolutionary resemblance of their innate antiviral pathways to that of humans (21). They first verified that recombinant zebrafish LysRS (zLysRS) interacts with RNA:DNA hybrids in vitro (FIG. 4A). They performed whole-body knock-down of the unique zebrafish orthologue of LysRS (zLysRS) by injecting wild-type one-cell zebrafish embryos with a splice-blocking morpholino oligomer targeting zlysrs (FIG. 4B) or with a control morpholino oligomer. Microscopy analysis of fish morphology showed no developmental defect (FIG. 4C). They quantified the expression levels of zlysrs, type I IFN (ifnφ1) and the IFN-response gene isg15 at 72 h post-injection (FIG. 4D). Knocking-down lysrs led to a global upregulation of the interferon response. Negative regulation of type I IFN by LysRS is therefore conserved in fish and mammals and represents a primordial mechanism.

In summary, the inventors show that LysRS recognizes RNA:DNA hybrids and that stimulation with RNA:DNA hybrids leads to Ap4A production and subsequent repression of STING-dependent Ifnβ expression. This provides the long sought-for molecular mechanism through which LysRS-Ap4A negatively modulates innate immune responses (9-11). They demonstrate that Ap4A and its non-hydrolysable analogue associate with the cGAMP-binding pocket of STING and down-regulate nucleic acid-induced chronic inflammation. Therefore, these data support a bona fide signaling function for Ap4A in mammalian cells. These data further reveal that Ap4A is a small molecule that prevents unnecessary STING activation. This mechanism likely complements existing cellular processes, which regulate cytosolic levels of nucleic acids to avoid unwanted triggering of the cGAS-STING pathway (22). However, in pathological situations where nucleic acids accumulate in the cytosol, like in the absence of cellular nucleases (15, 22) or upon chemotherapy (23, 24), the ability of LysRS to curb inflammatory responses is likely critical. These results therefore warrant the exploration of Ap4A as a biomarker for pathologies with elevated inflammation but no dysfunction of cGAS or STING. Interestingly, LysRS has been reported to contribute to HIV-1 infection (25) and congenital human pathologies without established links to inflammatory responses (26). Future work will therefore be necessary to elucidate the contribution of LysRS and Ap4A to acute and chronic inflammation to human pathologies. In this context, the identification of the compound STAN-1 (analogue of Ap4A) as a potential mean to act pharmacologically upon STING activation opens avenues of investigation to design anti-inflammatory drugs that target the LysRS-Ap4A-STING axis to ameliorate the prognosis of several human pathologies, including autoimmune disorders and malignancies.

EXAMPLE 2: TESTS OF DIFFERENT COMPOUNDS OF FORMULA (I) FOR INHIBITION OF TYPE I INTERFERON EXPRESSION (IFNα AND IFNβ)

This example is a good model of STING-dependent chronic inflammation.

For the test of Ap4A analogues (STAN-1, 4, 5, 12, 8, 9 and 10), MEF$^{TREX1-/-}$ were treated for 3 h with 500 μM of analogues prior to RNA extraction and RT-qPCR using Ifnβ and Infα, specific primers.

The results are in FIG. S4.

EXAMPLE 3: CYTOTOXICITY OF DIFFERENT COMPOUNDS OF FORMULA (I)

Cytotoxicity was measured as described in Krakowiak A, Pęcherzewska R, Kaczmarek R, Tomaszewska A, Nawrot B, Stec W J. Evaluation of influence of Ap4A analogues on Fhit-positive HEK293T cells; cytotoxicity and ability to induce apoptosis. Bioorg Med Chem. 2011 Aug. 15; 19(16): 5053-60 for STAN-1 and 3.

The results are the following:
STAN-1: $IC_{50}$ in HEK293 cells (MTT)=17.5±4.2 µM
STAN-3: $IC_{50}$ in HEK293 cells (MTT)>80 µM Cytotoxicity was measured as described in Walkowiak B, Baraniak J, Cierniewski C S, Stec W. Inhibition of ADP-triggered blood platelet aggregation by diadenosine polyphosphate analogues. Bioorg Med Chem Lett. 2002 Aug. 5; 12(15):1959-62 for STAN-1 and 12.

The results are the following:
STAN-12: $IC_{50}$ in the inhibitory activity in ADP-induced platelet aggregation=40 µM
STAN-1: $IC_{50}$ in the inhibitory activity in ADP-induced platelet aggregation=140 µM EXAMPLE 4: METABOLIC AND INFLAMMATORY ACTIVITY OF MEF-WT AND MEF-TREX CELLS TREATED WITH STAN-1 (JB-419)

The metabolic activity of STAN-1 (JB-419) was analyzed in MEF-WT and MEF-TREX cells using the MTT assay. The cells were plated at a density of 8000 cells per well on a 96-well plate (Nunc) and then the cells were exposed to the test compound. The aliquots of stock solution (750 mM) of the test compound (freshly dissolved in water) were added to the cell cultures to produce final concentrations ranging from 1-750 µM. The cells were incubated for 6, 24, 48 and 72 h at 37° C. in 5% $CO_2$ and then MTT solution in PBS (5 mg/mL) was added to each well. Then, the cells were incubated for 3 h at 37° C. and 5% $CO_2$. Finally, 954 of lysis buffer (NP-40, 20% SDS (sodium dodecyl sulfate), and 50% aqueous DMF (dimethylformamide), pH 4.5) was added to each well and incubated 3 h at 37° C. The plate absorbance was measured at two wavelengths, 570 nm and reference 630 nm (plate reader, colorless walls, Perkin-Elmer, Waltham, MA, USA). The results of figure S5 (A and B) are mean values from three independent experiments.

MEF knock out for Trex1 were either Mock-treated for 24 h or treated with 500, 250, 125, 62.25, 31.125 or 15.56 µM of STAN-1 prior to analysis of Ifnb, Ifit2 and Cxcl10 expression by RT-qPCR. Graphs of FIG. S6 present the mean of three experiments. Error bars present the standard deviation from the mean.

REFERENCES

1. O. Danilchanka, J. J. Mekalanos, Cyclic dinucleotides and the innate immune response. Cell 154, 962-970 (2013).
2. Q. Chen, L. Sun, Z. J. Chen, Regulation and function of the cGAS-STING pathway of cytosolic DNA sensing. Nat Immunol 17, 1142-1149 (2016).
3. S. Patel, L. Jin, TMEM173 variants and potential importance to human biology and disease. Genes Immun, (2018).
4. S. M. Haag et al., Targeting STING with covalent small-molecule inhibitors. Nature 559, 269-273 (2018).
5. S. Li et al., The Cyclopeptide Astin C Specifically Inhibits the Innate Immune CDN Sensor STING. Cell Rep 25, 3405-3421 e3407 (2018).
6. T. Siu et al., Discovery of a Novel cGAMP Competitive Ligand of the Inactive Form of STING. ACS Med Chem Lett 10, 92-97 (2019).
7. L. T. Khoo, L. Y. Chen, Role of the cGAS-STING pathway in cancer development and oncotherapeutic approaches. EMBO Rep 19, (2018).
8. S. Tshori, E. Razin, H. Nechushtan, Amino-acyl tRNA synthetases generate dinucleotide polyphosphates as second messengers: functional implications. Top Curr Chem 344, 189-206 (2014).
9. Y. N. Lee, H. Nechushtan, N. Figov, E. Razin, The function of lysyl-tRNA synthetase and Ap4A as signaling regulators of MITF activity in Fcepsilon RI-activated mast cells. Immunity 20, 145-151 (2004).
10. N. Yannay-Cohen et al., LysRS serves as a key signaling molecule in the immune response by regulating gene expression. Mol Cell 34, 603-611 (2009).
11. A. S. Marriott et al., NUDT2 Disruption Elevates Diadenosine Tetraphosphate (Ap4A) and Down-Regulates Immune Response and Cancer Promotion Genes. PLoS One 11, e0154674 (2016).
12. Y. Duan et al., A point-charge force field for molecular mechanics simulations of proteins based on condensed-phase quantum mechanical calculations. J Comput Chem 24, 1999-2012 (2003).
13. Y. N. Lee, E. Razin, Nonconventional involvement of LysRS in the molecular mechanism of USF2 transcriptional activity in FcepsilonRI-activated mast cells. Mol Cell Biol 25, 8904-8912 (2005).
14. A. Krakowiak et al., Evaluation of influence of Ap4A analogues on Fhit-positive HEK293T cells; cytotoxicity and ability to induce apoptosis. Bioorg Med Chem 19, 5053-5060 (2011). 15 15. M. A. Lee-Kirsch, The Type I Interferonopathies. Annu Rev Med 68, 297-315 (2017).
16. Y. W. Lim, L. A. Sanz, X. Xu, S. R. Hartono, F. Chedin, Genome-wide DNA hypomethylation and RNA:DNA hybrid accumulation in Aicardi-Goutieres syndrome. Elife 4, (2015).
17. S. B. Kwon, J. E. Yu, C. Park, J. Lee, B. L. Seong, Nucleic Acid-Dependent Structural Transition of the Intrinsically Disordered N-Terminal Appended Domain of Human Lysyl-tRNA Synthetase. Int J Mol Sci 19, (2018).
18. I. X. Wang et al., Human proteins that interact with RNA/DNA hybrids. Genome Res 28, 1405-1414 (2018).
19. M. P. Deutscher, The eucaryotic aminoacyl-tRNA synthetase complex: suggestions for its structure and function. J Cell Biol 99, 373-377 (1984).
20. R. E. Rigby et al., RNA:DNA hybrids are a novel molecular pattern sensed by TLR9. EMBO J 33, 542-558 (2014).
21. C. Langevin et al., The antiviral innate immune response in fish: evolution and conservation of the IFN system. J Mol Biol 425, 4904-4920 (2013).
22. G. Hartmann, Nucleic Acid Immunity. Adv Immunol 133, 121-169 (2017).
23. C. Bregnard et al., Upregulated LINE-1 Activity in the Fanconi Anemia Cancer Susceptibility Syndrome Leads to Spontaneous Pro-inflammatory Cytokine Production. EBioMedicine 8, 184-194 (2016).
24. F. Coquel et al., SAMHD1 acts at stalled replication forks to prevent interferon induction. Nature 557, 57-61 (2018).
25. A. A. Duchon et al., HIV-1 Exploits a Dynamic Multi-aminoacyl-tRNA Synthetase Complex To Enhance Viral Replication. J Virol 91, (2017).
26. A. Motzik, H. Nechushtan, S. Y. Foo, E. Razin, Non-canonical roles of lysyl-tRNA synthetase in health and disease. Trends Mol Med 19, 726-731 (2013).

The invention claimed is:

1. A method for inhibiting inflammation in a subject in need thereof, comprising administering to said subject a compound chosen from compounds of formula (I), their diastereoisomers and their salts:

(I)

Ado—O—P(=O)(X⁻)—Y—R1—Y—P(=O)(X⁻)—O—Ado wherein:
X is an oxygen or sulfur atom,
Y is an oxygen or sulfur atom or —NH—,
Ado is the adenosine residue,
R1 is selected from the groups consisting of

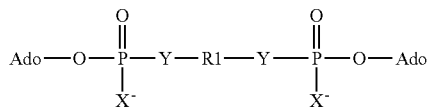

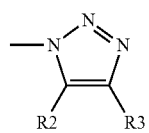

wherein Z is —OH, —OP(S)(OAdo)(OH), $N_3$, $NH_2$, —$CH_3$ or

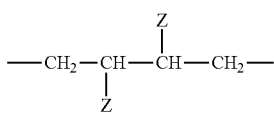

wherein R2 and R3 each represents a C1-C6 alkyl group or an aryl group,

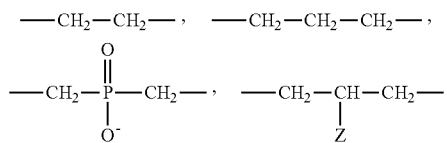

wherein Z represents —OH or —OP(O)(OH)$_2$,

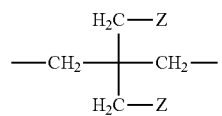

wherein Z represents —OH, —OP(O)(OH)$_2$ or —OP(O)(OH)(OAdo),

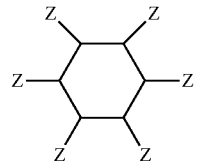

wherein Z represents a covalent bond, H, —OH or a C1-C6 alkyl group, and

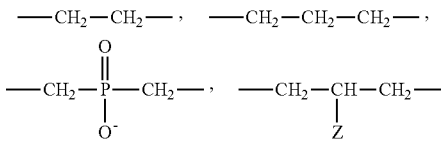

wherein Z represents a covalent bond, H, —OH or a C1-C5 alkyl group.

2. The method according to claim 1, wherein the inflammation is cancer-related inflammation.

3. The method according to claim 1, wherein said compound interacts with STING.

4. The method according to claim 1, wherein the C1-C6 alkyl is a linear hydrocarbon group comprising from 1 to 6 carbon atoms, or a branched hydrocarbon group comprising from 3 to 6 carbon atoms.

5. The method according to claim 1, wherein the C1-C5 alkyl is a linear hydrocarbon group comprising from 1 to 5 carbon atoms, or a branched hydrocarbon group comprising from 3 to 5 carbon atoms.

6. The method according to claim 1, wherein the aryl is a monocyclic or polycyclic aromatic hydrocarbon group, which may be optionally substituted.

7. The method according to claim 1, wherein the compound is chosen from compounds of formula (I), their diastereoisomers and their salts, wherein:

X is an oxygen or sulfur atom,
Y is an oxygen or sulfur atom or —NH—,
Ado is the adenosine residue,
R1 is selected from the groups consisting of wherein Z is —OH, —OP(S)(OAdo)(OH) or —CH$_3$,

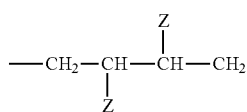

wherein Z represents —OH, and

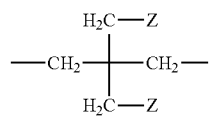

wherein Z represents —OP(O)(OH)$_2$ or —OP(O)(OH)(OAdo).

8. The method according to claim 1, wherein the compound is selected from the group consisting of
the compound of formula (I) wherein
X is a sulfur atom,
Y is an oxygen,
Ado is the adenosine residue, and
R1 is

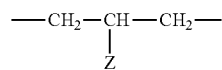

wherein Z is —OH,
the compound of formula (I) with wherein
X is a sulfur atom,
Y is an oxygen,
Ado is the adenosine residue, and
R1 is

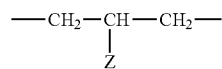

wherein Z is —CH$_3$,
the compound of formula (I) wherein
X is a sulfur atom,
Y is an oxygen,
Ado is the adenosine residue, and
R1 is

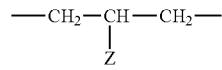

wherein Z is —OP(S)(OAdo)(OH),
the compound of formula (I) wherein
X is a sulfur atom,
Y is an oxygen,
Ado is the adenosine residue, and
R1 is —CH$_2$—CH$_2$—CH$_2$—,
the compound of formula (I) wherein
X is an oxygen,
Y is an oxygen,
Ado is the adenosine residue, and
R1 is —CH$_2$—CH$_2$—CH$_2$—,
the compound of formula (I) wherein
X is a sulfur,
Y is —NH—,
Ado is the adenosine residue, and
R1 is —CH$_2$—CH$_2$—CH$_2$—,
the compound of formula (I) wherein
X is an oxygen,
Y is —NH—,
Ado is the adenosine residue, and
R1 is —CH$_2$—CH$_2$—CH$_2$—,
the compound of formula (I) wherein
X is a sulfur,
Y is an oxygen,
Ado is the adenosine residue, and
R1 is —CH$_2$—CH$_2$—,
the compound of formula (I) wherein
X is an oxygen,
Y is an oxygen,
Ado is the adenosine residue, and
R1 is

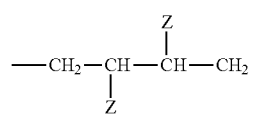

wherein Z represents —OH,
the compound of formula (I) wherein
X is an oxygen,
Y is an oxygen,
Ado is the adenosine residue, and
R1 is

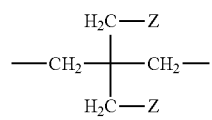

wherein Z represents —OP(O)(OH)(OAdo),
the compound of formula (I) wherein
X is an oxygen,
Y is an oxygen,
Ado is the adenosine residue, and
R1 is

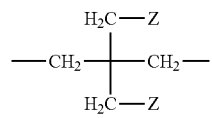

wherein Z represents —OP(O)(OH)$_2$, and
the compound of formula (I) wherein
X is a sulfur,
Y is an oxygen,
Ado is the adenosine residue, and
R1 is

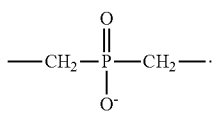

9. The method according to claim 2, wherein the cancer is pancreatic cancer.

10. A compound chosen from compounds of formula (II), their diastereoisomers and their salts:

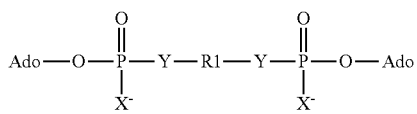
(II)

wherein:
X is an oxygen or sulfur atom,
Y is an oxygen or sulfur atom or —NH—,
Ado is the adenosine residue (A):

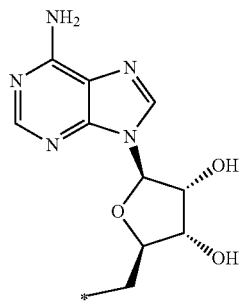
(A)

which is linked to the oxygen of the compound of formula (II) by carbon 5' of the ribose residue,
R1 is selected from the group consisting of

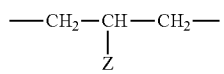

wherein Z is N₃ or

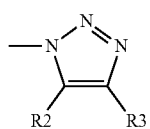

wherein R2 and R3 each represents a C1-C6 alkyl group or an aryl group,

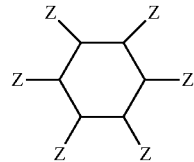

wherein Z represents a covalent bond, H, —OH or a C1-C6 alkyl group, and

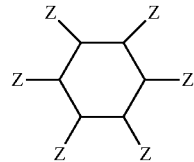

wherein Z represents a covalent bond, H, —OH or a C1-C5 alkyl group.

11. A composition comprising, in a pharmaceutically acceptable medium, at least one compound according to claim 10.

12. A method for inhibiting activation of Stimulator of Interferon Genes (STING), binding a compound according to claim 10 to the STING.

13. A method for preventing and/or treating inflammation in a subject in need thereof, comprising administering to said subject a therapeutically effective amount of a compound according to claim 10.

14. The method of claim 4, wherein the C1-C6 alkyl is selected from the group consisting of methyl, ethyl, n-propyl, isopropyl, n-butyl, isobutyl, tert-butyl, n-pentyl, isopentyl and n-hexyl groups, and preferably methyl, n-butyl, n-pentyl, n-hexyl, isopropyl and tert-butyl.

15. The method of claim 5, wherein the C1-C5 alkyl is selected from the group consisting of methyl, ethyl, n-propyl, isopropyl, n-butyl, isobutyl, tert-butyl, n-pentyl and isopentyl groups, and preferably methyl, n-butyl, n-pentyl, isopropyl, and tert-butyl.

16. The method of claim 6, wherein the aryl is phenyl.

* * * * *

SEQUENCE LISTING

<160> NUMBER OF SEQ ID NOS: 40

<210> SEQ ID NO 1
<211> LENGTH: 25
<212> TYPE: DNA
<213> ORGANISM: Artificial Sequence
<220> FEATURE:
<223> OTHER INFORMATION: Synthetic MO3i3

<400> SEQUENCE: 1
tccatattcg ctactcatcg tacat                                               25

<210> SEQ ID NO 2
<211> LENGTH: 25
<212> TYPE: DNA
<213> ORGANISM: Artificial Sequence
<220> FEATURE:
<223> OTHER INFORMATION: Synthetic MOctl

<400> SEQUENCE: 2
taccaaaagc tctcttatcg aggga                                               25

<210> SEQ ID NO 3
<211> LENGTH: 23
<212> TYPE: DNA
<213> ORGANISM: Artificial Sequence
<220> FEATURE:
<223> OTHER INFORMATION: Synthetic forward primer

<400> SEQUENCE: 3
tggaccccaa tcaatacttc aag                                                 23

<210> SEQ ID NO 4
<211> LENGTH: 24
<212> TYPE: DNA
<213> ORGANISM: Artificial Sequence
<220> FEATURE:
<223> OTHER INFORMATION: Synthetic reverse primer

<400> SEQUENCE: 4
ggtctccagg ctgaaggtgg ttat                                                24

<210> SEQ ID NO 5
<211> LENGTH: 24
<212> TYPE: DNA
<213> ORGANISM: Artificial Sequence
<220> FEATURE:
<223> OTHER INFORMATION: Synthetic mIFNbeta forward

<400> SEQUENCE: 5
ctgcgttcct gctgtgcttc tcca                                                24

<210> SEQ ID NO 6
<211> LENGTH: 24
<212> TYPE: DNA
<213> ORGANISM: Artificial Sequence
<220> FEATURE:
<223> OTHER INFORMATION: Synthetic mIFNbeta reverse

<400> SEQUENCE: 6
ttctccgtca tctccatagg gatc                                                24

<210> SEQ ID NO 7
<211> LENGTH: 22
<212> TYPE: DNA
<213> ORGANISM: Artificial Sequence

```
<220> FEATURE:
<223> OTHER INFORMATION: Synthetic mIL-6 forward

<400> SEQUENCE: 7
gacttccatc cagttgcctt ct                                           22

<210> SEQ ID NO 8
<211> LENGTH: 22
<212> TYPE: DNA
<213> ORGANISM: Artificial Sequence
<220> FEATURE:
<223> OTHER INFORMATION: Synthetic mIL-6 reverse

<400> SEQUENCE: 8
tcctctccgg acttgtgaag ta                                           22

<210> SEQ ID NO 9
<211> LENGTH: 20
<212> TYPE: DNA
<213> ORGANISM: Artificial Sequence
<220> FEATURE:
<223> OTHER INFORMATION: Synthetic mIL-8 forward

<400> SEQUENCE: 9
catcttcgtc cgtccctgtg                                              20

<210> SEQ ID NO 10
<211> LENGTH: 20
<212> TYPE: DNA
<213> ORGANISM: Artificial Sequence
<220> FEATURE:
<223> OTHER INFORMATION: Synthetic mIL-8 reverse

<400> SEQUENCE: 10
ccttcaccca tggagcatca                                              20

<210> SEQ ID NO 11
<211> LENGTH: 24
<212> TYPE: DNA
<213> ORGANISM: Artificial Sequence
<220> FEATURE:
<223> OTHER INFORMATION: Synthetic mIFN alpha forward

<400> SEQUENCE: 11
gctttactga tggtcctggt ggtg                                         24

<210> SEQ ID NO 12
<211> LENGTH: 24
<212> TYPE: DNA
<213> ORGANISM: Artificial Sequence
<220> FEATURE:
<223> OTHER INFORMATION: Synthetic mIFN alpha reverse

<400> SEQUENCE: 12
aatccaaaat ccttcctgtc cttc                                         24

<210> SEQ ID NO 13
<211> LENGTH: 22
<212> TYPE: DNA
<213> ORGANISM: Artificial Sequence
<220> FEATURE:
<223> OTHER INFORMATION: Synthetic mSTING forward

<400> SEQUENCE: 13
ttgggtactt ggggttgatc tt                                           22
```

```
<210> SEQ ID NO 14
<211> LENGTH: 23
<212> TYPE: DNA
<213> ORGANISM: Artificial Sequence
<220> FEATURE:
<223> OTHER INFORMATION: Synthetic mSTING reverse

<400> SEQUENCE: 14
gcaccactga gcatgttgtt atg                                              23

<210> SEQ ID NO 15
<211> LENGTH: 20
<212> TYPE: DNA
<213> ORGANISM: Artificial Sequence
<220> FEATURE:
<223> OTHER INFORMATION: Synthetic mLysRS forward

<400> SEQUENCE: 15
gtactgccct ggaatacggg                                                  20

<210> SEQ ID NO 16
<211> LENGTH: 20
<212> TYPE: DNA
<213> ORGANISM: Artificial Sequence
<220> FEATURE:
<223> OTHER INFORMATION: Synthetic mLysRS reverse

<400> SEQUENCE: 16
tttcagtggt cgctgcagtt                                                  20

<210> SEQ ID NO 17
<211> LENGTH: 20
<212> TYPE: DNA
<213> ORGANISM: Artificial Sequence
<220> FEATURE:
<223> OTHER INFORMATION: Synthetic mGAPDH forward

<400> SEQUENCE: 17
ttcaccacca tggagaaggc                                                  20

<210> SEQ ID NO 18
<211> LENGTH: 20
<212> TYPE: DNA
<213> ORGANISM: Artificial Sequence
<220> FEATURE:
<223> OTHER INFORMATION: Synthetic mGAPDH reverse

<400> SEQUENCE: 18
ggcatcgact gtggtcatga                                                  20

<210> SEQ ID NO 19
<211> LENGTH: 19
<212> TYPE: DNA
<213> ORGANISM: Artificial Sequence
<220> FEATURE:
<223> OTHER INFORMATION: Synthetic zfACTIN forward

<400> SEQUENCE: 19
cgagctgtct tcccatcca                                                   19

<210> SEQ ID NO 20
<211> LENGTH: 23
<212> TYPE: DNA
<213> ORGANISM: Artificial Sequence
<220> FEATURE:
<223> OTHER INFORMATION: Synthetic zfACTIN reverse
```

```
<400> SEQUENCE: 20
tcaccaacgt agctgtcttt ctg                                         23

<210> SEQ ID NO 21
<211> LENGTH: 24
<212> TYPE: DNA
<213> ORGANISM: Artificial Sequence
<220> FEATURE:
<223> OTHER INFORMATION: Synthetic zfIFN phi forward

<400> SEQUENCE: 21
gaatggcttg gccgatacag gata                                        24

<210> SEQ ID NO 22
<211> LENGTH: 24
<212> TYPE: DNA
<213> ORGANISM: Artificial Sequence
<220> FEATURE:
<223> OTHER INFORMATION: Synthetic zfIFN phi reverse

<400> SEQUENCE: 22
tcctccacct ttgacttgtc catc                                        24

<210> SEQ ID NO 23
<211> LENGTH: 23
<212> TYPE: DNA
<213> ORGANISM: Artificial Sequence
<220> FEATURE:
<223> OTHER INFORMATION: Synthetic zfLysRS forward P2

<400> SEQUENCE: 23
tggaccccaa tcaatacttc aag                                         23

<210> SEQ ID NO 24
<211> LENGTH: 24
<212> TYPE: DNA
<213> ORGANISM: Artificial Sequence
<220> FEATURE:
<223> OTHER INFORMATION: Synthetic zfLysRS reverse P2

<400> SEQUENCE: 24
ggtctccagg ctgaaggtgg ttat                                        24

<210> SEQ ID NO 25
<211> LENGTH: 40
<212> TYPE: RNA
<213> ORGANISM: Artificial Sequence
<220> FEATURE:
<223> OTHER INFORMATION: Synthetic RNA 2

<400> SEQUENCE: 25
uuucaauucc uuuuaggauu aaucuugaag auagaguuaa                       40

<210> SEQ ID NO 26
<211> LENGTH: 40
<212> TYPE: RNA
<213> ORGANISM: Artificial Sequence
<220> FEATURE:
<223> OTHER INFORMATION: Synthetic RNA 5

<400> SEQUENCE: 26
uuaacucuau cuucaagauu aauccuaaaa ggaauugaaa                       40

<210> SEQ ID NO 27
```

```
<210> SEQ ID NO 27
<211> LENGTH: 40
<212> TYPE: DNA
<213> ORGANISM: Artificial Sequence
<220> FEATURE:
<223> OTHER INFORMATION: Synthetic DNA 9

<400> SEQUENCE: 27
ttaactctat cttcaagatt aatcctaaaa ggaattgaaa                          40

<210> SEQ ID NO 28
<211> LENGTH: 40
<212> TYPE: DNA
<213> ORGANISM: Artificial Sequence
<220> FEATURE:
<223> OTHER INFORMATION: Synthetic DNA 6

<400> SEQUENCE: 28
tttcaattcc ttttaggatt aatcttgaag atagagttaa                          40

<210> SEQ ID NO 29
<211> LENGTH: 40
<212> TYPE: RNA
<213> ORGANISM: Artificial Sequence
<220> FEATURE:
<223> OTHER INFORMATION: Synthetic bRNA 2

<400> SEQUENCE: 29
uuucaauucc uuuuaggauu aaucuugaag auagaguuaa                          40

<210> SEQ ID NO 30
<211> LENGTH: 40
<212> TYPE: DNA
<213> ORGANISM: Artificial Sequence
<220> FEATURE:
<223> OTHER INFORMATION: Synthetic bDNA 9

<400> SEQUENCE: 30
ttaactctat cttcaagatt aatcctaaaa ggaattgaaa                          40

<210> SEQ ID NO 31
<211> LENGTH: 60
<212> TYPE: DNA
<213> ORGANISM: Artificial Sequence
<220> FEATURE:
<223> OTHER INFORMATION: Synthetic shSTING forward

<400> SEQUENCE: 31
gatcccctga ttctactatc gtcttattca agagataaga cgatagtaga atcatttttc    60

<210> SEQ ID NO 32
<211> LENGTH: 60
<212> TYPE: DNA
<213> ORGANISM: Artificial Sequence
<220> FEATURE:
<223> OTHER INFORMATION: Synthetic shSTING reverse

<400> SEQUENCE: 32
tcgagaaaaa tgattctact atcgtcttat ctcttgaata agacgatagt agaatcaggg    60

<210> SEQ ID NO 33
<211> LENGTH: 60
<212> TYPE: DNA
<213> ORGANISM: Artificial Sequence
<220> FEATURE:
<223> OTHER INFORMATION: Synthetic shLysRS 1 forward

<400> SEQUENCE: 33
```
gatccccgaa tcagcatggt agaagattca agagatcttc taccatgctg attctttttc     60

<210> SEQ ID NO 34
<211> LENGTH: 60
<212> TYPE: DNA
<213> ORGANISM: Artificial Sequence
<220> FEATURE:
<223> OTHER INFORMATION: Synthetic shLysRS 1 reverse

<400> SEQUENCE: 34
tcgagaaaaa gaatcagcat ggtagaagat ctcttgaatc ttctaccatg ctgattcggg     60

<210> SEQ ID NO 35
<211> LENGTH: 60
<212> TYPE: DNA
<213> ORGANISM: Artificial Sequence
<220> FEATURE:
<223> OTHER INFORMATION: Synthetic shLysRS 2 forward

<400> SEQUENCE: 35
gatccccgaa atttatcgtc cgctctttca agagaagagc ggacgataaa tttctttttc     60

<210> SEQ ID NO 36
<211> LENGTH: 60
<212> TYPE: DNA
<213> ORGANISM: Artificial Sequence
<220> FEATURE:
<223> OTHER INFORMATION: Synthetic shLysRS 2 reverse

<400> SEQUENCE: 36
tcgagaaaaa gaaatttatc gtccgctctt ctcttgaaag agcggacgat aaatttcggg     60

<210> SEQ ID NO 37
<211> LENGTH: 60
<212> TYPE: DNA
<213> ORGANISM: Artificial Sequence
<220> FEATURE:
<223> OTHER INFORMATION: Synthetic shLysRS 3 forward

<400> SEQUENCE: 37
gatccccgcc tttcatcacc tatcacttca agagagtgat aggtgatgaa aggcttttc     60

<210> SEQ ID NO 38
<211> LENGTH: 60
<212> TYPE: DNA
<213> ORGANISM: Artificial Sequence
<220> FEATURE:
<223> OTHER INFORMATION: Synthetic shLysRS 3 reverse

<400> SEQUENCE: 38
tcgagaaaaa gcctttcatc acctatcact ctcttgaagt gataggtgat gaaaggcggg     60

<210> SEQ ID NO 39
<211> LENGTH: 60
<212> TYPE: DNA
<213> ORGANISM: Artificial Sequence
<220> FEATURE:
<223> OTHER INFORMATION: Synthetic shLysRS human forward

<400> SEQUENCE: 39 gatccccaa ggtatcgcca gagatattca agagatatct ctggcgatac cttgttttc     60

<210> SEQ ID NO 40
<211> LENGTH: 60
<212> TYPE: DNA

```
<213> ORGANISM: Artificial Sequence
<220> FEATURE:
<223> OTHER INFORMATION: Synthetic shLysRS human reverse

<400> SEQUENCE: 40
tcgagaaaaa caaggtatcg ccagagatat ctcttgaata tctctggcga taccttgggg    60
```